(12) United States Patent
Yagi et al.

(10) Patent No.: US 11,597,033 B2
(45) Date of Patent: Mar. 7, 2023

(54) LASER PROCESSING HEAD, LASER PROCESSING DEVICE, AND METHOD FOR ADJUSTING LASER PROCESSING HEAD

(71) Applicant: PRIMETALS TECHNOLOGIES JAPAN, LTD., Hiroshima (JP)

(72) Inventors: Takahiro Yagi, Hiroshima (JP); Hiroshi Oishi, Hiroshima (JP); Ryosuke Mitsuoka, Hiroshima (JP)

(73) Assignee: PRIMETALS TECHNOLOGIES JAPAN, LTD., Hiroshima (JP)

( * ) Notice: Subject to any disclaimer, the term of this patent is extended or adjusted under 35 U.S.C. 154(b) by 0 days.

(21) Appl. No.: 16/977,420

(22) PCT Filed: Mar. 23, 2018

(86) PCT No.: PCT/JP2018/011894
§ 371 (c)(1),
(2) Date: Sep. 1, 2020

(87) PCT Pub. No.: WO2019/180960
PCT Pub. Date: Sep. 26, 2019

(65) Prior Publication Data
US 2021/0046582 A1  Feb. 18, 2021

(51) Int. Cl.
*B23K 26/06* (2014.01)
*B23K 26/073* (2006.01)
*B23K 26/38* (2014.01)

(52) U.S. Cl.
CPC ........ *B23K 26/0648* (2013.01); *B23K 26/073* (2013.01); *B23K 26/38* (2013.01); *B23K 26/0643* (2013.01)

(58) Field of Classification Search
CPC .............. B23K 26/064; B23K 26/0648; B23K 26/0652; B23K 26/066; B23K 26/0665;
(Continued)

(56) References Cited

U.S. PATENT DOCUMENTS 4,772,122 A * 9/1988 Kasner ................... B23K 26/04
219/121.81
4,937,440 A * 6/1990 Hofer ................ G11B 11/10576
(Continued)

FOREIGN PATENT DOCUMENTS

BR 102017014519-0 A2 2/2018
DE 102014210119 A1 12/2015
(Continued)

OTHER PUBLICATIONS https://www.azooptics.com/Article.aspx?ArticleID=660 (Year: 2014).*
(Continued)

*Primary Examiner* — Dana Ross
*Assistant Examiner* — Adam Michael Eckardt
(74) *Attorney, Agent, or Firm* — Birch, Stewart, Kolasch & Birch, LLP

(57) ABSTRACT

A laser processing head includes a laser irradiation part, a collimating optical system for collimating laser light from the laser irradiation part, and a collecting optical system for collecting the laser light after passing through the collimating optical system. An optical system including the collimating optical system and the collecting optical system is configured such that the laser light after passing through the collecting optical system has coma aberration. The laser processing head further includes a first moving part for moving at least one of the laser irradiation part or the collimating optical system so as to change a relative position of the collimating optical system with respect to the laser irradiation part, in a first direction orthogonal to a center axis of the laser irradiation part or the collimating optical system, and a second moving part for moving the collecting optical system so as to change a relative position of the collecting optical system with respect to the collimating optical sys-
(Continued)

tem, in a second direction orthogonal to a center axis of the collecting optical system.

10 Claims, 19 Drawing Sheets

(58) Field of Classification Search
CPC ............... B23K 26/38; B23K 2101/40; B23K 2103/50; B23K 26/032; B23K 26/046; B23K 26/40; B23K 26/53; B23K 101/40; B23K 26/00; B23K 26/02; B23K 26/04; B23K 26/06; B23K 26/0626; B23K 26/0643; B23K 26/073; G02B 27/095; G02B 27/0955; G02B 27/48; G02B 5/001; G02B 13/00; G02B 26/08; G02B 27/00; G02B 6/00; G02B 7/28; H01L 21/301

See application file for complete search history.

(56) References Cited

U.S. PATENT DOCUMENTS

| | | | | |
|---|---|---|---|---|
| 5,156,943 | A * | 10/1992 | Whitney | G02B 27/4216 430/323 |
| 6,897,942 | B2 * | 5/2005 | Shiraishi | G03F 7/70075 355/71 |
| 6,967,710 | B2 * | 11/2005 | Shiraishi | G03F 7/70075 355/53 |
| 7,947,968 | B1 * | 5/2011 | Markle | G03B 27/54 372/101 |
| 8,097,825 | B2 * | 1/2012 | Sato | B23K 35/0244 219/84 |
| 8,148,211 | B2 * | 4/2012 | Bruland | H01L 21/76894 219/68 |
| 9,346,126 | B2 * | 5/2016 | Watanabe | G02B 27/40 |
| 9,418,193 | B2 * | 8/2016 | Dowski, Jr. | B24B 13/06 |
| 9,796,046 | B2 * | 10/2017 | Rumsby | B23K 26/364 |
| 9,878,400 | B1 * | 1/2018 | Olesen | B23K 26/0643 |
| 10,114,289 | B2 * | 10/2018 | Jamar | G03F 7/2051 |
| 10,118,250 | B1 * | 11/2018 | Budd | H01L 21/6835 |
| 10,207,368 | B2 * | 2/2019 | Watanabe | B23K 26/06 |
| 10,723,139 | B2 * | 7/2020 | Mattes | B23K 26/342 |
| 11,058,585 | B2 * | 7/2021 | Hanft | G02B 26/105 |
| 2005/0013328 | A1 * | 1/2005 | Jurgensen | B23K 26/389 372/24 |
| 2005/0162746 | A1 * | 7/2005 | Lizotte | G02B 27/09 359/618 |
| 2006/0022008 | A1 * | 2/2006 | Brown | C03B 33/091 225/93.5 |
| 2006/0209310 | A1 * | 9/2006 | Muenz | G02B 27/0927 356/521 |
| 2006/0249491 | A1 * | 11/2006 | Jurgensen | B23K 26/0676 219/121.76 |
| 2007/0000885 | A1 * | 1/2007 | Thomas | B08B 7/0042 219/121.68 |
| 2007/0106285 | A1 * | 5/2007 | Raksi | G02B 26/0875 606/17 |
| 2008/0029497 | A1 * | 2/2008 | Eda | B23K 26/53 219/121.68 |
| 2008/0094640 | A1 * | 4/2008 | Cordingley | B23K 26/0665 219/121.72 |
| 2010/0044353 | A1 * | 2/2010 | Olsen | B23K 26/082 219/121.72 |
| 2012/0188365 | A1 * | 7/2012 | Stork | B23K 26/046 348/90 |
| 2013/0319985 | A1 * | 12/2013 | Nomaru | B23K 26/0869 219/121.75 |
| 2014/0131328 | A1 * | 5/2014 | Watanabe | B23K 26/06 219/121.72 |
| 2014/0291304 | A1 * | 10/2014 | Mudd, II | B23K 26/323 219/121.64 |
| 2015/0146183 | A1 * | 5/2015 | Deguenther | G03F 7/70066 359/292 |
| 2015/0352666 | A1 * | 12/2015 | Fujita | B23K 26/402 219/121.61 |
| 2016/0004074 | A1 * | 1/2016 | Zhang | G02B 27/0972 359/223.1 |
| 2016/0016261 | A1 * | 1/2016 | Mudd, II | B23K 26/242 219/121.64 |
| 2016/0067824 | A1 * | 3/2016 | Dajnowski | B23K 26/361 219/121.64 |
| 2016/0221120 | A1 * | 8/2016 | Narita | B23K 26/0648 |
| 2017/0225393 | A1 * | 8/2017 | Shkolnik | B23K 26/342 |
| 2017/0276951 | A1 * | 9/2017 | Kumkar | B23K 26/066 |
| 2017/0325325 | A1 * | 11/2017 | Lambert | G02B 7/182 |
| 2018/0009062 | A1 | 1/2018 | Sbetti | |
| 2018/0029164 | A1 * | 2/2018 | Kramer | B23K 26/705 |
| 2018/0105451 | A1 * | 4/2018 | Wieland | C03B 33/04 |
| 2018/0294189 | A1 * | 10/2018 | Ogiwara | H01L 21/6836 |
| 2018/0369963 | A1 * | 12/2018 | Tsukui | B23K 26/03 |
| 2019/0047894 | A1 * | 2/2019 | Heiss | B23K 26/0608 |
| 2019/0053946 | A1 * | 2/2019 | Raksi | G02B 26/0875 |
| 2019/0062196 | A1 * | 2/2019 | Bui | B23K 26/53 |
| 2019/0135678 | A1 * | 5/2019 | Liu | B23K 26/0617 |
| 2019/0219815 | A1 * | 7/2019 | Price | G02B 26/101 |
| 2019/0232428 | A1 * | 8/2019 | Roychowdhury | B23K 26/0626 |
| 2019/0283178 | A1 * | 9/2019 | Mishchik | B33Y 10/00 |
| 2019/0324286 | A1 * | 10/2019 | Op 'T Root | H01S 3/225 |
| 2020/0026090 | A1 * | 1/2020 | Hargis | G02B 21/16 |
| 2020/0156184 | A1 * | 5/2020 | Regaard | B23K 26/043 |
| 2021/0046582 | A1 * | 2/2021 | Yagi | B23K 26/38 |
| 2021/0060695 | A1 * | 3/2021 | Yokoyama | B23K 26/382 |
| 2021/0074585 | A1 * | 3/2021 | Zeng | B23K 26/0861 |
| 2021/0136332 | A1 * | 5/2021 | Takashima | H04N 9/3152 |

FOREIGN PATENT DOCUMENTS

| | | |
|---|---|---|
| JP | 2014-97523 A | 5/2014 |
| JP | 2014-184456 A | 10/2014 |
| KR | 1020150014142 A | 2/2015 |

OTHER PUBLICATIONS

Extended European Search Report for European Application No. 18910395.5, dated Mar. 9, 2021.

Indian Office Action for Indian Application No. 202017036781, dated Mar. 15, 2021, with English translation.

* cited by examiner

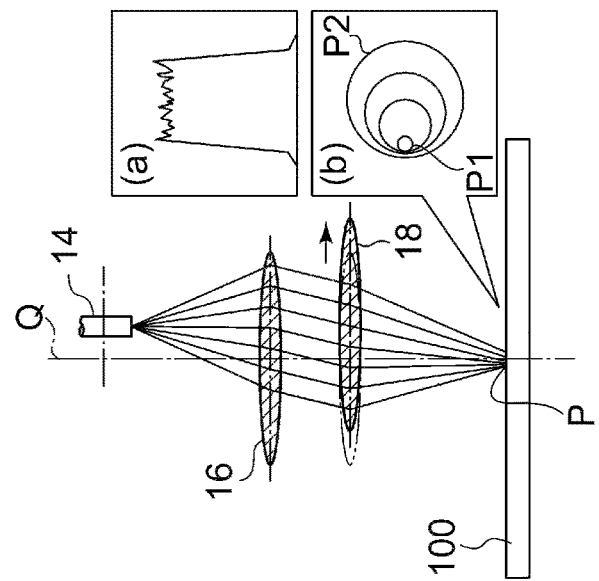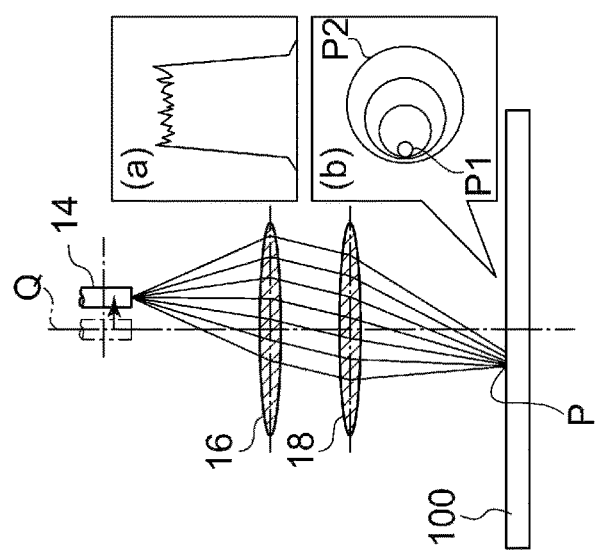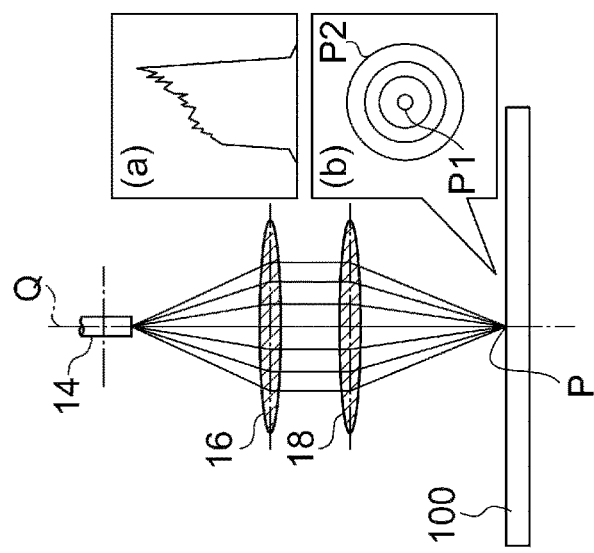

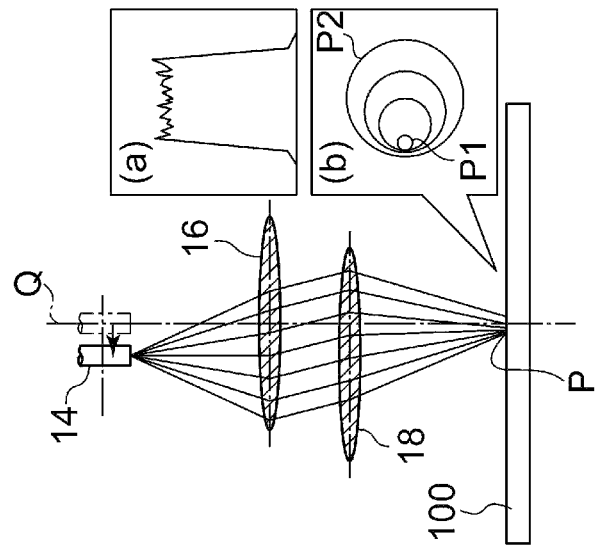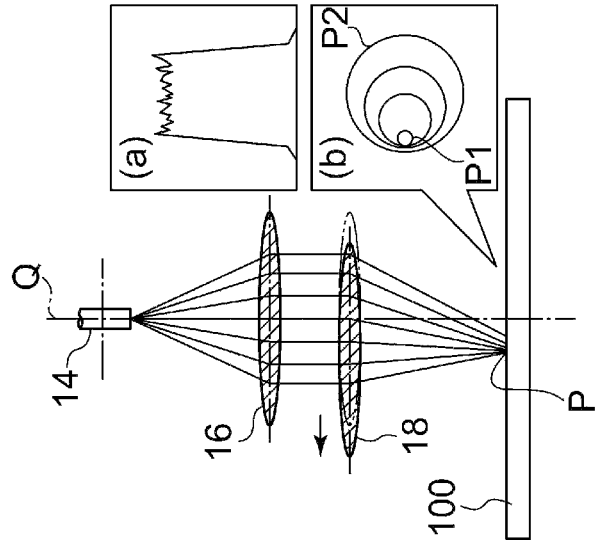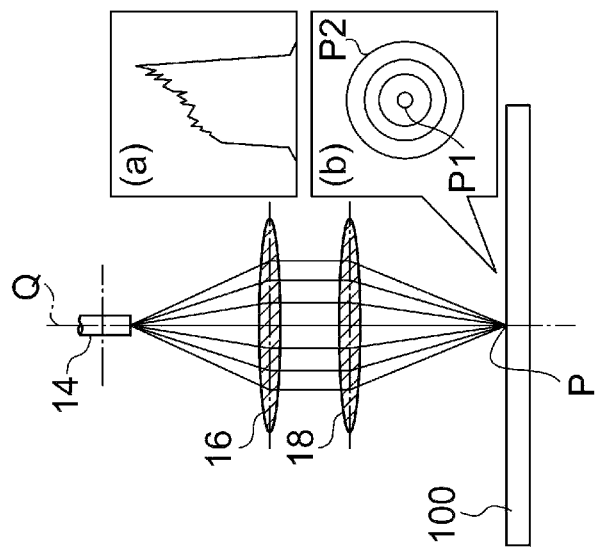

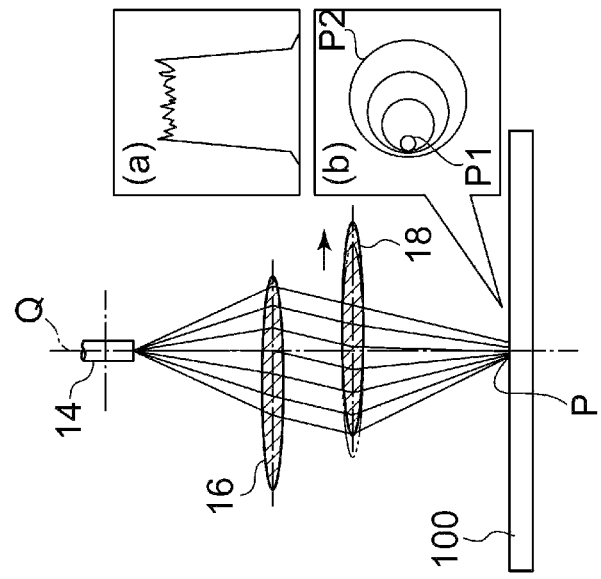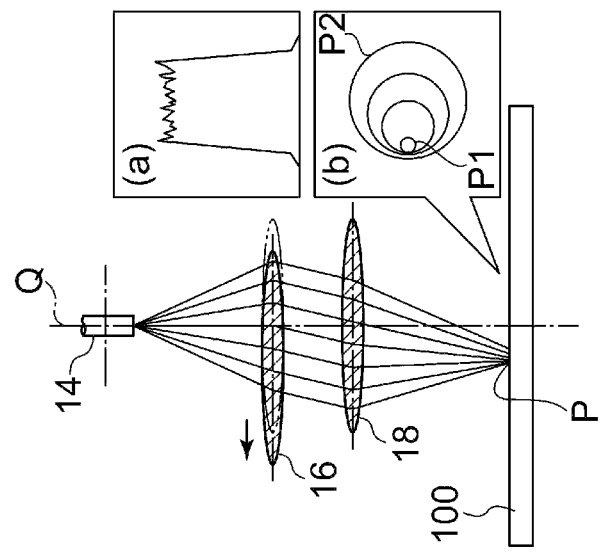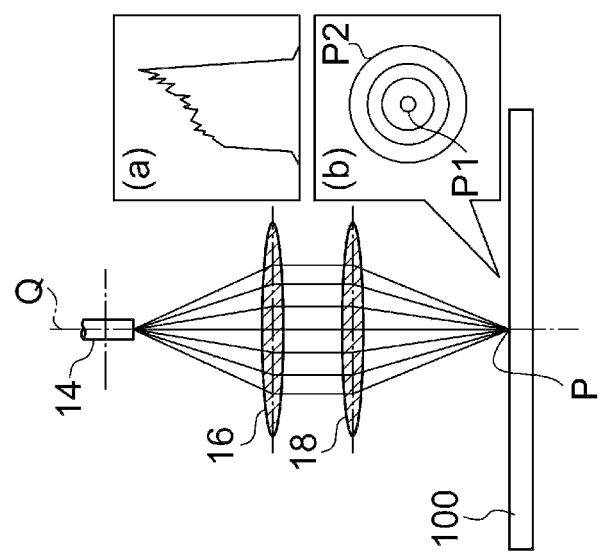

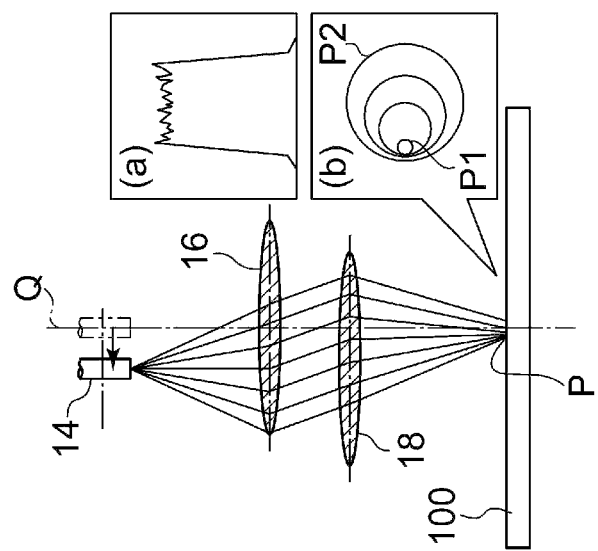
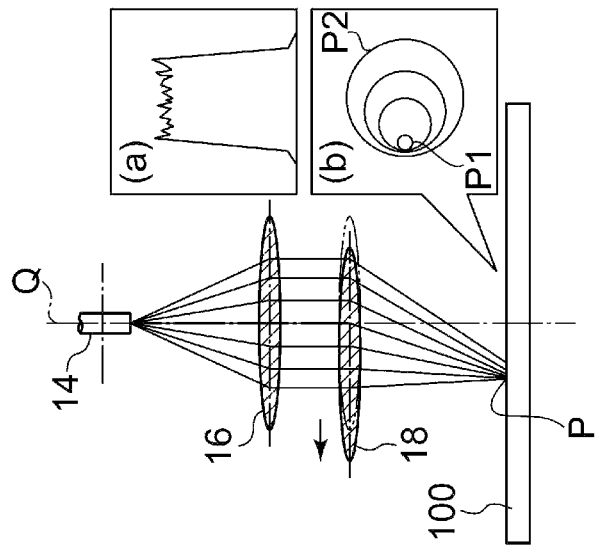
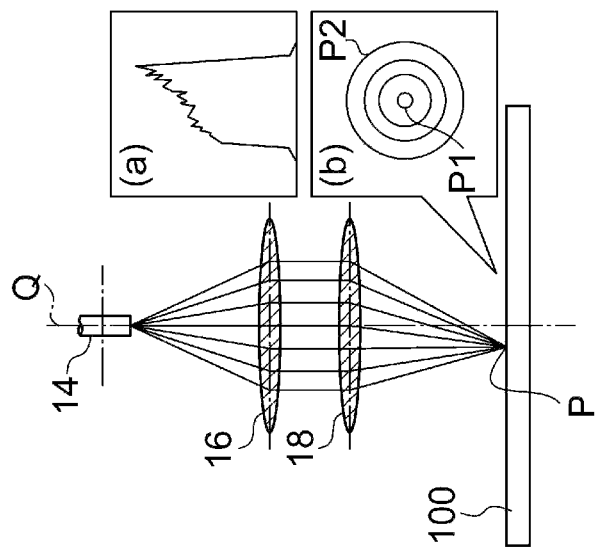

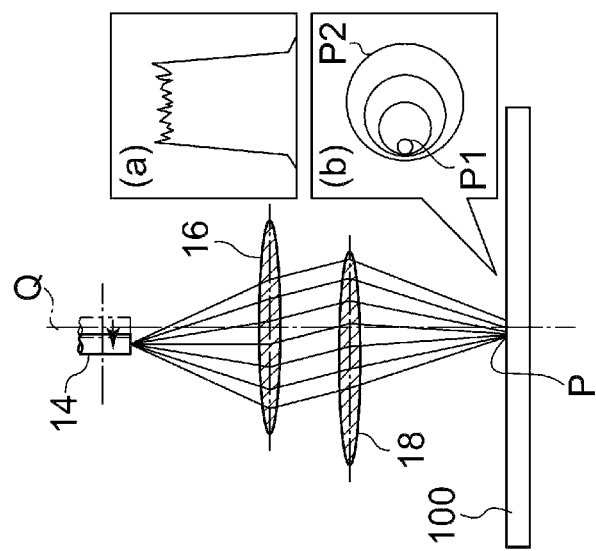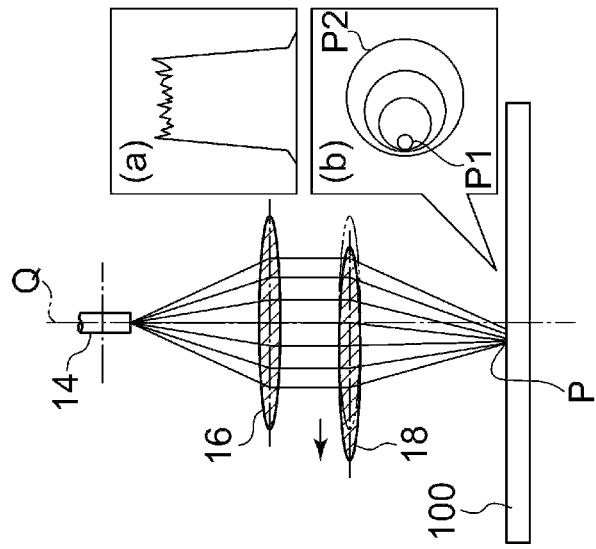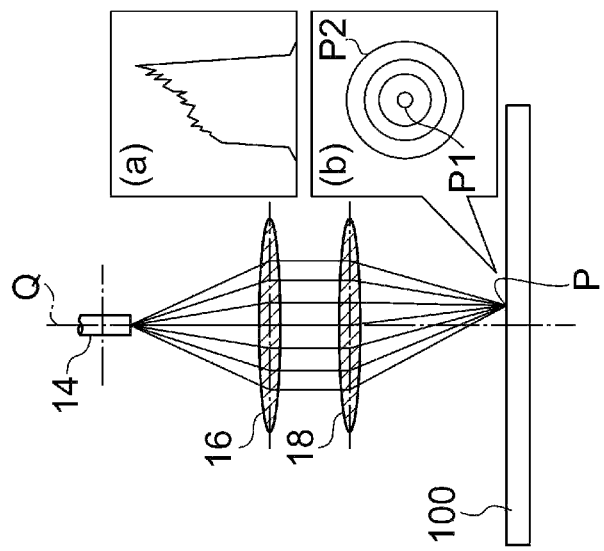

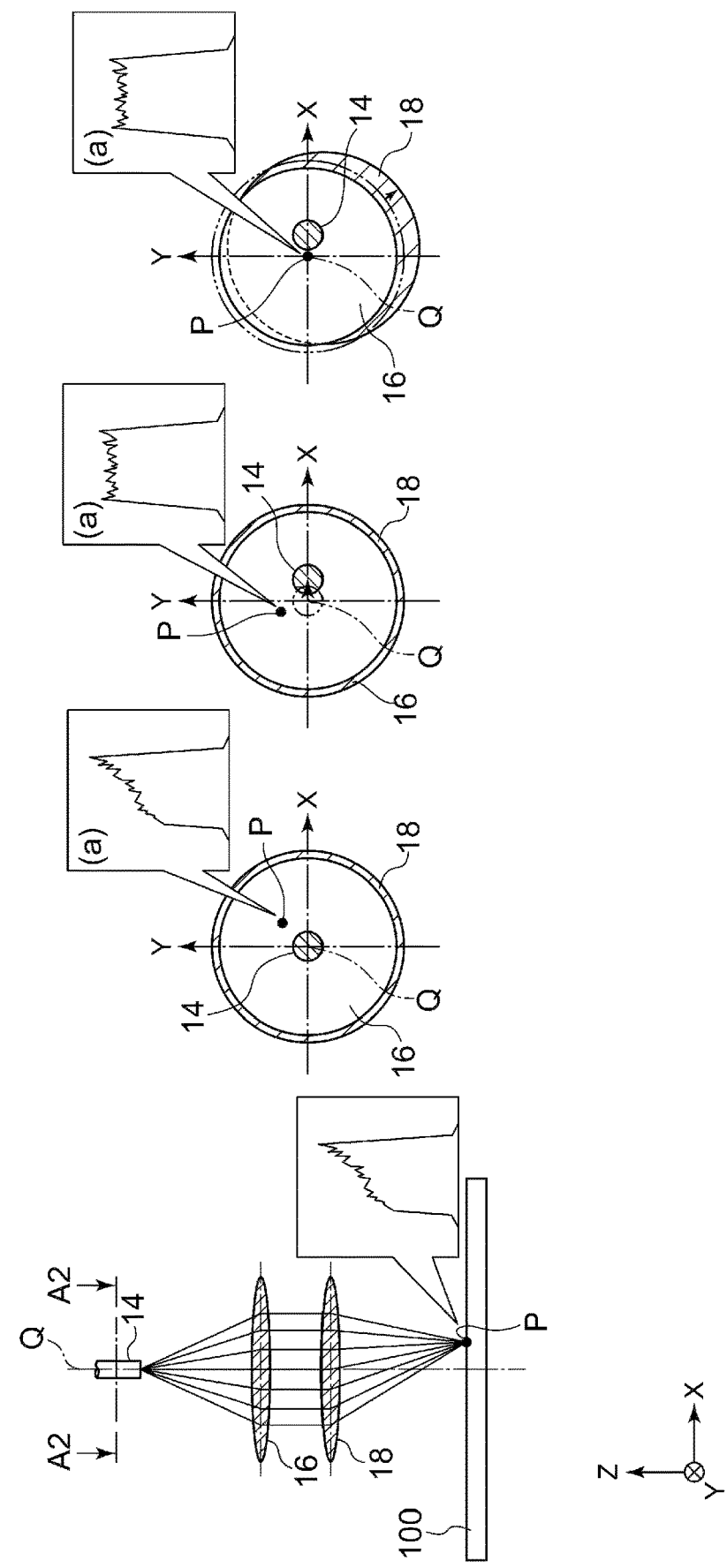

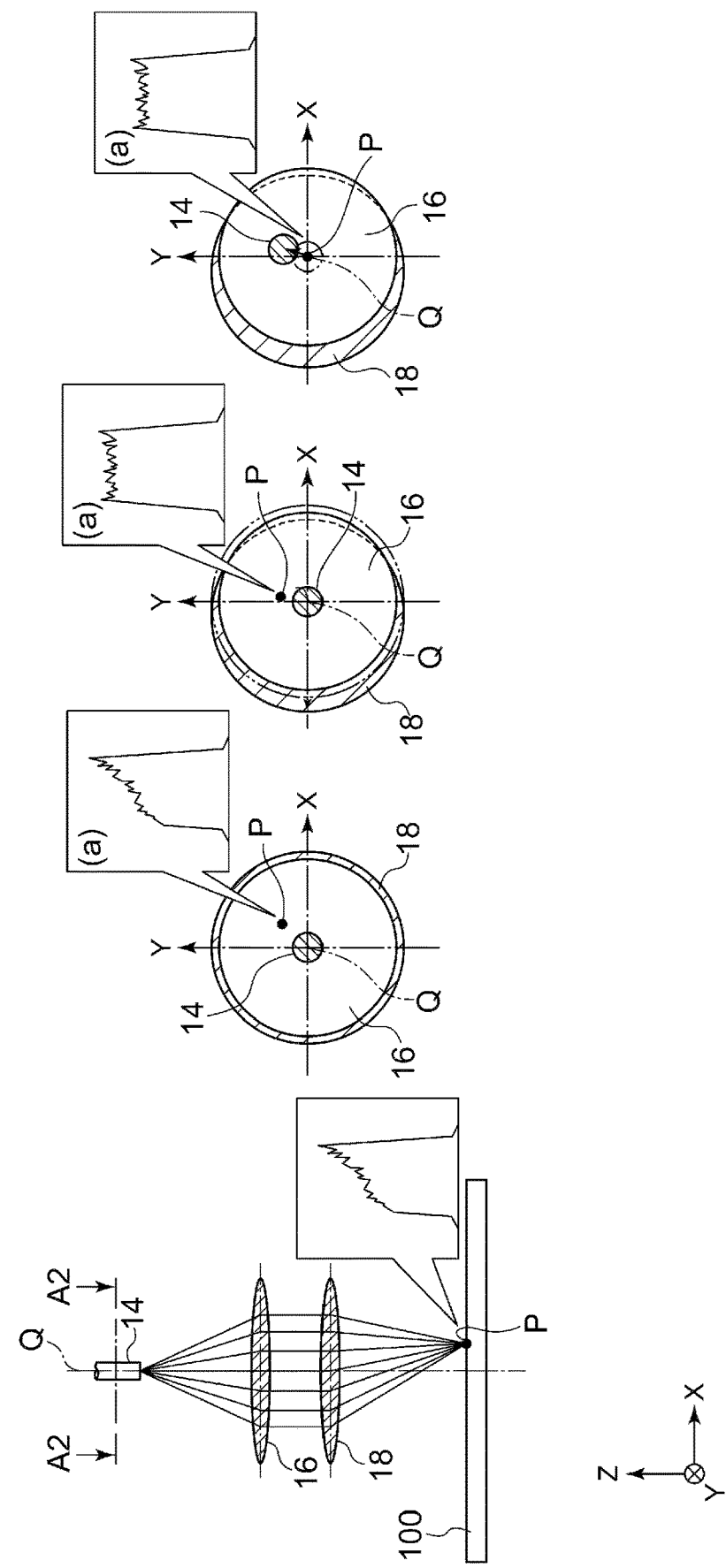

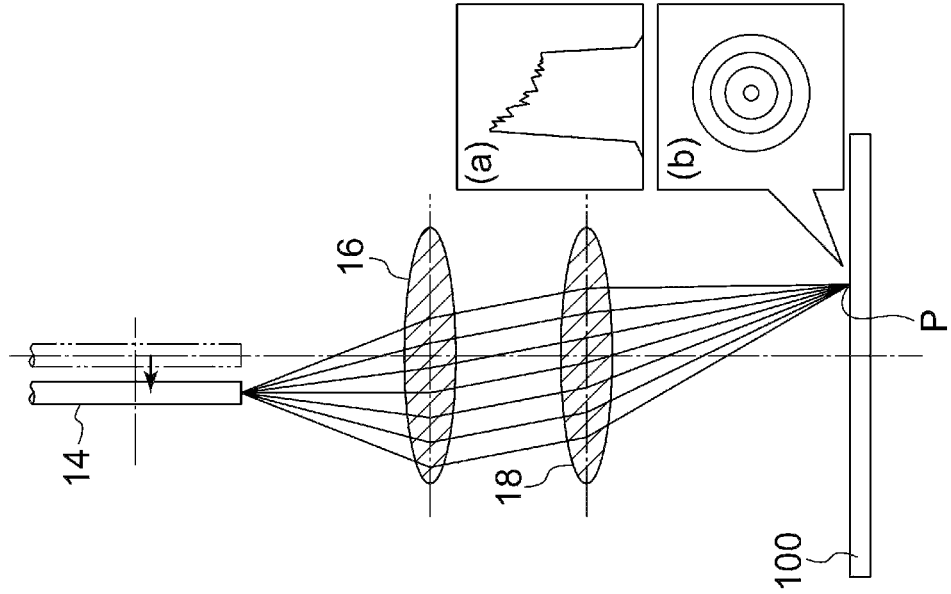
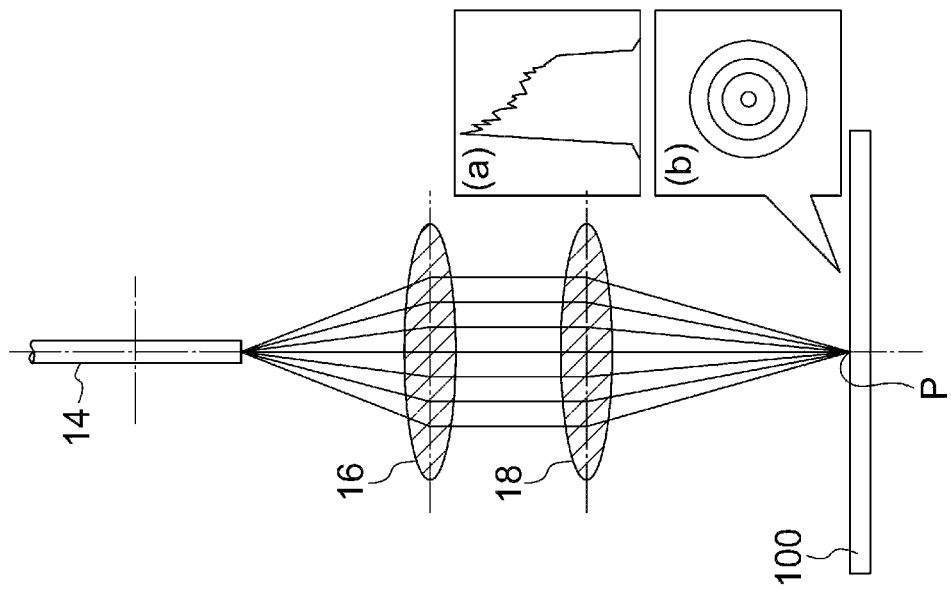

LASER PROCESSING HEAD, LASER PROCESSING DEVICE, AND METHOD FOR ADJUSTING LASER PROCESSING HEAD

TECHNICAL FIELD

The present disclosure relates to a laser processing head, a laser processing device, and a method for adjusting the laser processing head.

BACKGROUND

In laser processing such as laser cutting and laser welding, a laser processing device is used, which includes a laser processing head for irradiating a workpiece with laser light from a laser oscillator.

For example, Patent Document 1 discloses a laser processing device that includes a cutting head including a laser incident part to which an optical fiber for transmitting laser light from a laser oscillator is fixed, and a lens through which the laser light emitted from the laser incident part passes. In the laser processing device, the laser light from the laser incident part is collected by the lens to increase an energy density of the laser light, thereby cutting a workpiece.

Moreover, in the cutting head for the laser processing device of Patent Document 1, a positional relationship between the laser incident part and the lens can be adjusted by moving or inclining the laser incident part and the optical fiber with respect to the lens. Thus, it is possible to change an energy intensity distribution of the laser light at a position where the workpiece is cut.

CITATION LIST

Patent Literature

Patent Document 1: JP2014-97523A

SUMMARY

Technical Problem

Meanwhile, in laser processing, processing quality may be influenced by an energy intensity distribution of laser light collected at a processing position of a workpiece. For example, in the case of laser cutting, if an energy intensity distribution of laser light collected in the workpiece is biased, roughness of a cut surface of the workpiece tends to increase in a place where an energy density of the laser light is relatively low, as compared with a place where the energy density is relatively high.

In this regard, for example, in the cutting head of Patent Document 1, it is considered that the energy intensity distribution at the processing position of the workpiece can be changed to a desired distribution as needed by adjusting the positional relationship between the laser incident part and the lens, making it possible to obtain appropriate processing quality.

However, if the positional relationship between the laser incident part and the lens is changed in order to adjust the energy intensity distribution, in general, an irradiation position (collecting position) of the laser light on the workpiece also changes accordingly.

Then, the irradiation position of the laser light on the workpiece deviates from an original processing point (that is, the irradiation position before the positional relationship between the laser incident part and the lens is changed). Thus, it is necessary to adjust the irradiation position of the laser light by changing a positional relationship between the workpiece and the laser processing head including the laser incident part.

Moreover, in a case in which an accessory device such as a nozzle for processing assist gas is disposed in the vicinity of a processing point such as the tip of the laser processing head, the irradiation position of the laser light may overlap the accessory device as a result of changing the positional relationship between the laser incident part and the lens as described above. In this case, a positional relationship between the above-described accessory device and the laser processing head including the laser incident part needs to be changed so the irradiation position of the laser light and the accessory device do not overlap.

Thus, it is desired that the energy intensity distribution of the laser light irradiating the workpiece can be adjusted, and the laser irradiation position (collecting position) on the workpiece can be adjusted without adjusting the relative positional relationship between the laser processing head and the workpiece or the accessory device.

In view of the above, an object of at least one embodiment of the present invention is to provide a laser processing head and a laser processing device capable of achieving both adjustment of the energy intensity distribution of the laser light irradiating the workpiece and adjustment of the laser irradiation position on the workpiece, and a method for adjusting the laser processing head.

Solution to Problem

A laser processing head according to at least one embodiment of the present invention includes a laser irradiation part, a collimating optical system for collimating laser light from the laser irradiation part, and a collecting optical system for collecting the laser light after passing through the collimating optical system. An optical system including the collimating optical system and the collecting optical system is configured such that the laser light after passing through the collecting optical system has coma aberration. The laser processing head further includes a first moving part for moving at least one of the laser irradiation part or the collimating optical system so as to change a relative position of the collimating optical system with respect to the laser irradiation part, in a first direction orthogonal to a center axis of the laser irradiation part or the collimating optical system, and a second moving part for moving the collecting optical system so as to change a relative position of the collecting optical system with respect to the collimating optical system, in a second direction orthogonal to a center axis of the collecting optical system.

Advantageous Effects

According to at least one embodiment of the present invention, a laser processing head and a laser processing device capable of achieving both adjustment of an energy intensity distribution of laser light irradiating a workpiece and adjustment of a laser irradiation position on the workpiece, and a method for adjusting the laser processing head are provided.

BRIEF DESCRIPTION OF DRAWINGS

FIGS. 5A to 5C are views of an example of an adjustment process of the laser processing head according to an embodiment.

FIGS. 6A to 6C are views of an example of an adjustment process of the laser processing head according to an embodiment.

FIGS. 7A to 7C are views of an example of an adjustment process of the laser processing head according to an embodiment.

FIGS. 12A to 12C are views of an example of an adjustment process of the laser processing head according to an embodiment.

FIGS. 14A to 14C are views of an example of an adjustment process of the laser processing head according to an embodiment.

FIGS. 17A1 to 17C are views of an example of an adjustment process of the laser processing head according to an embodiment.

FIGS. 18A1 to 18C are views of an example of an adjustment process of the laser processing head according to an embodiment.

FIGS. 19A and 19B are views of an adjustment process of a typical laser processing head.

DETAILED DESCRIPTION

Figure 1:
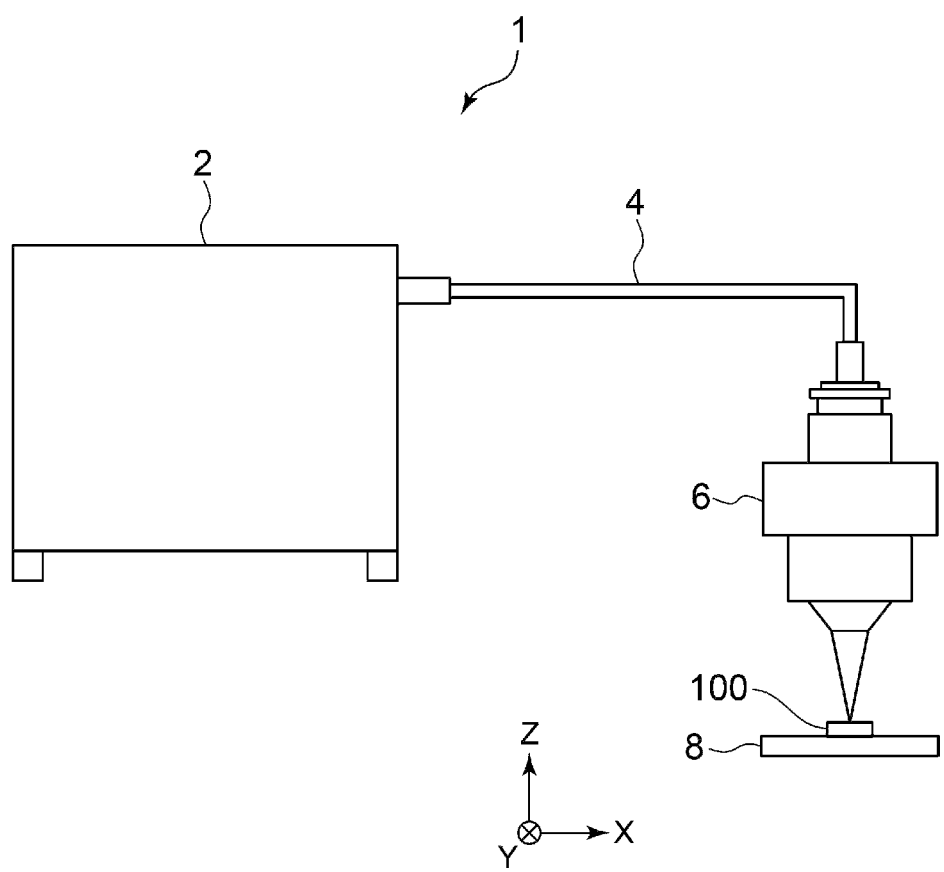
FIG. 1 is a schematic view of a laser processing device according to an embodiment.

Some embodiments of the present invention will be described below with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present invention.

First, the overview of a laser processing device including a laser processing head according to some embodiments will be described.

FIG. 1 is a schematic view of the laser processing device according to an embodiment. As shown in FIG. 1, a laser processing device 1 includes a laser oscillator 2 for oscillating laser light, an optical fiber 4, a laser processing head 6, and a processing stage 8.

The laser oscillator 2 may be, for example, a fiber laser oscillator using the optical fiber 4 as a medium. In the case of the fiber laser oscillator, laser light having a wavelength of 1,070 nm to 1,080 nm is obtained. The laser light generated by the laser oscillator 2 is transmitted to the optical fiber 4.

The laser oscillator 2 is not limited to the fiber laser oscillator. In some embodiments, the laser oscillator 2 may be, for example, a $CO_2$ laser oscillator, a YAG laser oscillator, or the like.

The optical fiber 4 is connected to the laser oscillator 2 on one end side and is connected to the laser processing head 6 on the other end side. The optical fiber 4 is configured to transmit the laser light from the laser oscillator 2 to the laser processing head 6.

The laser light oscillated by the laser oscillator 2 is transmitted to the laser processing head 6 via the optical fiber 4. Although the laser processing head 6 will be described in detail later, the laser processing head 6 includes a collecting lens. The laser light from the laser oscillator 2 is collected by the collecting lens to increase an energy density thereof, irradiating a workpiece 100 placed on the processing stage 8 with the laser light. With the laser light thus emitted, the workpiece 100 is processed (for example, cut, welded, or the like).

The workpiece 100 may be made from metal or alloy.

A processing position of the workpiece 100 by laser irradiation from the laser processing head 6 (that is, a laser irradiation position) is moved by relatively moving the workpiece 100 with respect to the laser processing head 6, thereby performing processing.

For example, in some embodiments, the laser processing head 6 is fixed, whereas the processing stage 8, where the workpiece 100 is placed, is configured to be movable on a plane (X-Y plane; see FIG. 1) orthogonal to an incident axis of the laser light emitted from the optical fiber 4 to the laser processing head 6. Thus, the workpiece 100 placed on the processing stage 8 is movable with respect to the laser processing head 6 and the laser light in the above-described X-Y plane.

Moreover, in some other embodiments, the processing stage 8 and the workpiece 100 are fixed, whereas the laser processing head 6 may be disposed to be movable in the above-described X-Y plane.

The workpiece 100 is thus relatively moved with respect to the laser processing head 6, making it possible to linearly or curvaceously cut, or weld the workpiece 100.

Next, the laser processing head 6 according to some embodiments will be described in more detail.

Figure 2:
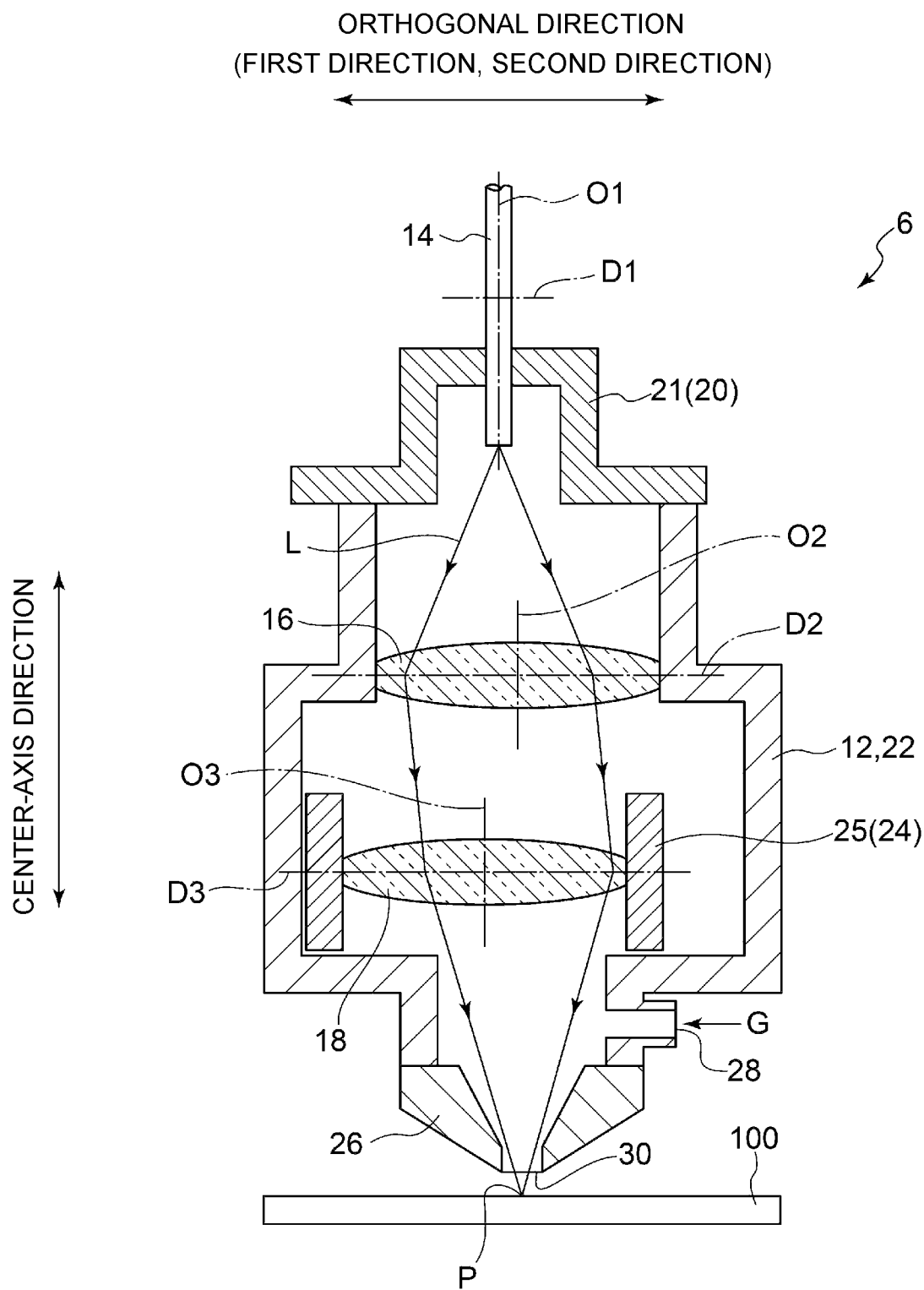
FIG. 2 is a schematic cross-sectional view of a laser processing head according to an embodiment.
Figure 3:
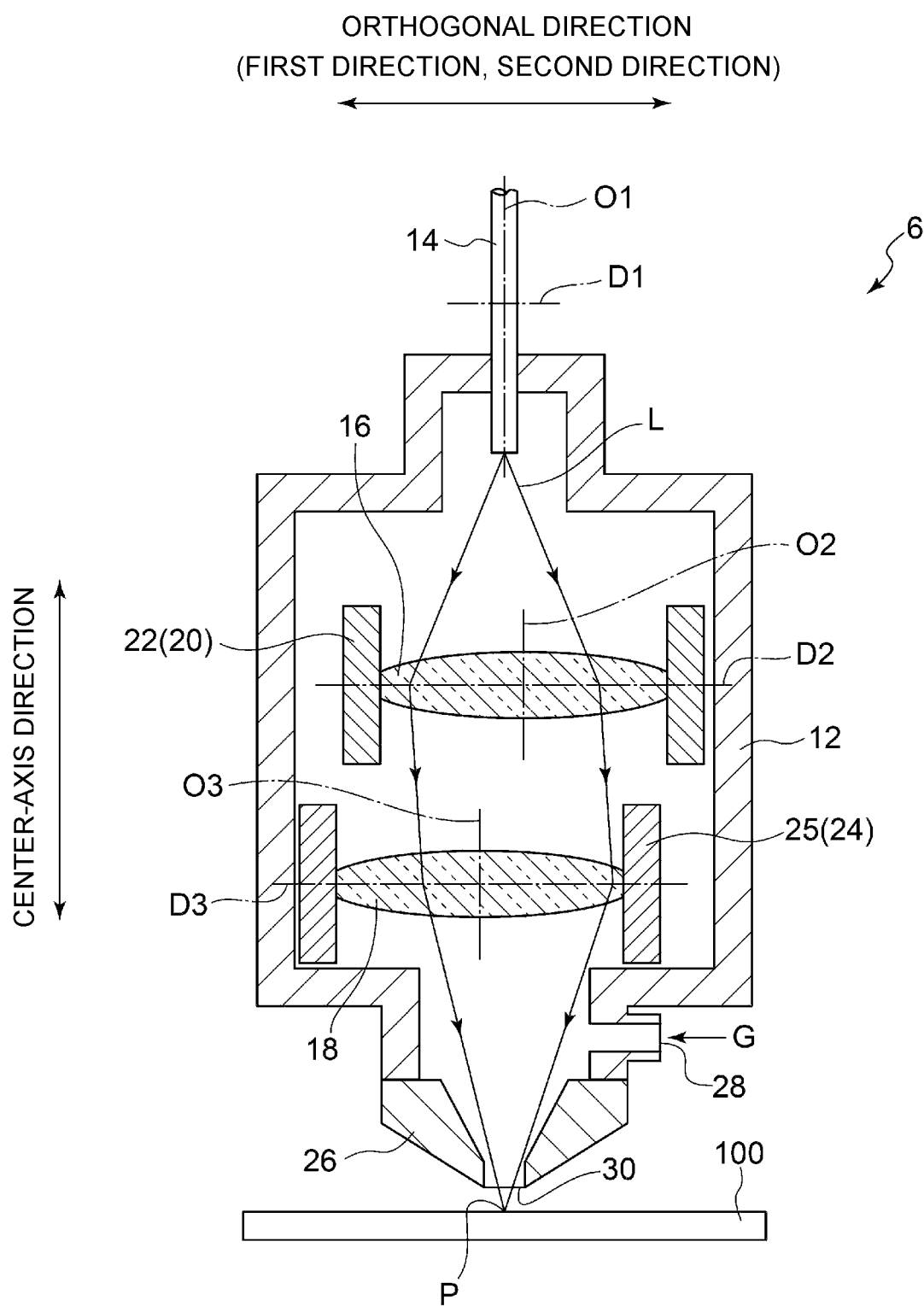
FIG. 3 is a schematic cross-sectional view of the laser processing head according to an embodiment.

Each of FIGS. 2 and 3 is a schematic cross-sectional view of the laser processing head 6 according to an embodiment. As shown in FIGS. 2 and 3, the laser processing head 6 according to some embodiments includes a laser irradiation part 14 for emitting laser lights L from the optical fiber 4 (see FIG. 1) toward the workpiece 100, a collimate lens 16 serving as a collimating optical system, and a collecting lens 18 serving as a collecting optical system.

The laser irradiation part 14, the collimate lens 16, and the collecting lens 18 are arranged in this order, in a direction of a center axis O3 of the collecting lens.

The laser irradiation part 14 is held by a holding part 21 so a center axis O1 of the laser irradiation part 14 does not deviate. The collimate lens 16 and the collecting lens 18 are disposed in a housing 12, and are supported by the housing 12 via a first lens holding part 22 and a second lens holding part 25, respectively, or directly.

In an exemplary embodiment shown in FIG. 2, the holding part 21 holding the laser irradiation part 14 is disposed separately from the housing 12. Moreover, the collimate lens 16 is fixed to the housing 12 serving as the first lens holding part 22, and the collecting lens 18 is supported by the housing 12 via the second lens holding part 25.

In an exemplary embodiment shown in FIG. 3, the housing 12 housing the optical system functions as the holding part 21 holding the laser irradiation part 14. Moreover, the collimate lens 16 is supported by the housing 12 via the first lens holding part 22, and the collecting lens 18 is supported by the housing 12 via the second lens holding part 25.

The collimate lens 16 (collimating optical system) is configured to collimate the laser lights emitted from the laser irradiation part 14 with a spread angle, that is, to adjust the laser lights to be in a parallel state. The collecting lens 18 (collecting optical system) is configured to collect the laser lights after passing through the collimate lens 16 (collimating optical system). As described above, the workpiece is processed by irradiating the workpiece with the laser lights collected by the collecting lens 18 and having the high energy density.

The laser processing head 6 shown in FIGS. 2 and 3 is a laser cutting head including an assist gas nozzle 26 for emitting a cutting assist gas G toward the processing position at the time of laser processing. The assist gas nozzle 26 has a gas supply port 28 and a gas outlet 30, and emits the cutting assist gas G, which is supplied from the gas supply port 28, from the gas outlet 30 toward the processing position, at the time of laser processing.

Moreover, although not particularly illustrated, in other embodiments, the laser processing head 6 may be a laser welding head used for laser welding. In this case, the laser processing head 6 may be provided with a welding wire supply device for supplying a welding wire to the processing position and an assist gas nozzle for emitting a welding assist gas toward the processing position.

In the laser processing head 6 shown in FIGS. 2 and 3, an optical system including the collimate lens 16 (collimating optical system) and the collecting lens 18 (collecting optical system) is configured such that the laser lights after passing through the collecting lens 18 (collecting optical system) can have coma aberration.

Moreover, the laser processing head 6 includes a first moving part 20 for moving at least one of the laser irradiation part 14 or the collimate lens 16 (collimating optical system), and a second moving part 24 for moving the collecting lens 18 (collecting optical system).

The first moving part 20 is configured to move at least one of the laser irradiation part 14 or the collimate lens 16 (collimating optical system) so as to change a relative position of the collimate lens 16 (collimating optical system) with respect to the laser irradiation part 14, in a first direction (a direction of D1 or D2 in FIGS. 2 and 3) orthogonal to the center axis O1 of the laser irradiation part 14 or a center axis O2 of the collimate lens 16 (collimating optical system).

The second moving part is configured to move the collecting lens 18 (collecting optical system) so as to change a relative position of the collecting lens 18 (collecting optical system) with respect to the collimate lens 16 (collimating optical system), in a second direction (the direction of D3 in FIGS. 2 and 3) orthogonal to the center axis O3 of the collecting lens 18 (collecting optical system).

In the exemplary embodiment shown in FIG. 2, the holding part 21 holding the laser irradiation part 14 functions as the first moving part 20, and the second lens holding part 25 holding the collecting lens 18 functions as the second moving part 24.

That is, the holding part 21 is movable in a plane orthogonal to the center axis O2 of the collimate lens 16 (collimating optical system). Thus, the relative position of the collimate lens 16 (collimating optical system) with respect to the laser irradiation part 14 is changed in the first direction orthogonal to the center axis O2 of the collimate lens 16 (collimating optical system).

Moreover, the second lens holding part 25 is movable in a plane orthogonal to the center axis O3 of the collecting lens 18. Thus, the relative position of the collecting lens 18 (collecting optical system) with respect to the collimate lens 16 (collimating optical system) is changed in the second direction orthogonal to the center axis O3 of the collecting lens 18 (collecting optical system).

Moreover, in the exemplary embodiment shown in FIG. 3, the first lens holding part 22 holding the collimate lens 16 functions as the first moving part 20, and the second lens holding part 25 holding the collecting lens 18 functions as the second moving part 24.

That is, the first lens holding part 22 is movable in the plane orthogonal to the center axis O2 of the collimate lens 16 (collimating optical system). Thus, the relative position of the collimate lens 16 (collimating optical system) with respect to the laser irradiation part 14 is changed in the first direction orthogonal to the center axis O2 of the collimate lens 16 (collimating optical system).

Moreover, the second lens holding part 25 is movable in the plane orthogonal to the center axis O3 of the collecting lens 18. Thus, the relative position of the collecting lens 18 (collecting optical system) with respect to the collimate lens 16 (collimating optical system) is changed in the second direction orthogonal to the center axis O3 of the collecting lens 18 (collecting optical system).

In the exemplary embodiments shown in FIGS. 2 and 3, the center axes O1 to O3 extend in the same direction. Thus, the planes orthogonal to the center axes O1 to O3, respectively, are parallel to each other. Moreover, the planes orthogonal to the center axes O1 to O3, respectively, may be planes parallel to the X-Y plane in coordinates shown in FIG. 1.

As a means for moving the laser irradiation part 14, the collimate lens 16, or the collecting lens 18 as the first moving part 20 or the second moving part 24, a well-known means can be used. For example, as the first moving part 20 or the second moving part 24, it is possible to use an X-Y stage capable of moving an object to be held in two directions orthogonal to each other. Alternatively, the first moving part 20 or the second moving part 24 may be configured to be able to move the object to be held in the two directions orthogonal to each other, by using a known means such as a ball screw.

In the exemplary embodiments shown in FIGS. 2 and 3, the collimating optical system and the collecting optical system are each composed of one lens (the collimate lens 16 and the collecting lens 18). However, in the other embodiments, the collimating optical system and the collecting optical system may each include at least two lenses.

Moreover, between the collimating optical system and the collecting optical system, at least one reflection mirror may be disposed. Since the reflection mirror is thus disposed, it is possible to fold an optical path of each of the laser lights from the collimating optical system toward the collecting optical system into, for example, an L-shape or an N-shape by reflection with the reflection mirror. Thus, the laser processing head 6 may be downsized, as compared with a case in which the laser irradiation part 14, the collimating optical system, and the collecting optical system are arranged linearly.

Figure 4:
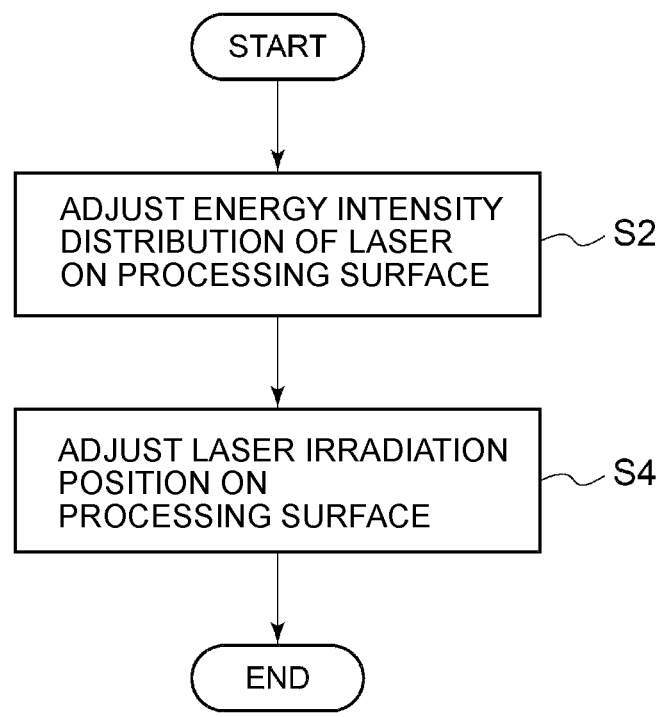
FIG. 4 is a flowchart showing the overview of a method for adjusting the laser processing head according to an embodiment.

FIG. 4 is a flowchart showing the overview of a method for adjusting the laser processing head 6 according to an embodiment.

Moreover, FIGS. 5A to 18C are views each showing an example of an adjustment process of the laser processing head 6 shown in FIG. 2 or FIG. 3, where any one of the laser irradiation part 14, the collimate lens 16, or the collecting lens 18 is moved in the order of (A), (B), and (C). Arrows in the views indicate moving directions of these members, respectively. For example, FIG. 5A shows an initial state before the laser processing head 6 is adjusted, FIG. 5B shows a state after the laser irradiation part 14 is moved from a position in the initial state (indicated by a double-dotted chain line), and FIG. 5C shows a state after the collecting lens 18 is moved from a position in FIG. 5B (indicated by a double-dotted chain line).

Moreover, (a) of FIGS. 5A to 18C each represent an energy intensity distribution in an X direction at an irradiation position P on the workpiece 100 (may also be simply referred to as an energy intensity distribution, hereinafter).

(b) of FIGS. 5A to 18C each indicate a ray position on the X-Y plane at the irradiation position P on the workpiece 100. A position P1 indicates a position where light in the vicinity of the center of a ray is collected, and a position P2 indicates a position where light outside the ray is collected.

FIGS. 5A to 18C are each a simplified view showing only main constituent elements of the laser processing head 6.

The laser processing head 6 shown in FIG. 2 or 3 can adjust the energy intensity distribution and the irradiation position P (that is, it is possible to adjust the laser processing head 6) by a procedure to be described below.

As shown in FIG. 4, in an embodiment, first, an energy intensity of the laser light output from the laser processing head 6 on a processing surface of the workpiece 100 is adjusted to a desired distribution (first adjustment step; S2). Next, the irradiation position P on the processing surface of the workpiece 100 is adjusted (second adjustment step; S4).

(First Adjustment Step S2)

In the first adjustment step, the following one of the first moving step or the second moving step is performed.

That is, in the first moving step, with the above-described first moving part 20, at least one of the laser irradiation part 14 or the collimate lens 16 is moved so as to change the relative position of the collimate lens 16 with respect to the laser irradiation part 14, in the first direction orthogonal to the center axis O1 of the laser irradiation part 14 or the center axis O2 of the collimate lens 16. In the second moving step, with the above-described second moving part 24, the collecting lens 18 is moved so as to change the relative position of the collecting lens 18 with respect to the collimate lens 16, in the second direction orthogonal to the center axis O3 of the collecting lens 18.

In the first adjustment step, one of the above-described first moving step or second moving step, where a change amount of the coma aberration is larger, is performed. That is, the change amount of the coma aberration relative to a moving amount of the collimate lens 16 with respect to the laser irradiation part 14 in the first direction by the first moving part 20 is compared with that of the collecting lens 18 with respect to the collimate lens 16 in the second direction by the second moving part 24, and one of the above-described first moving step or second moving step having the larger change amount is performed.

Thus, in the first adjustment step, the energy intensity of the laser light output from the laser processing head 6 on the processing surface of the workpiece 100 is adjusted to the desired distribution.

The above-described change amount of the coma aberration may be a change amount of a distance between the position P1 (see FIGS. 5A to 5C and the like), where the light in the vicinity of the center of the ray is collected, and the position P2 (see FIGS. 5A to 5C and the like), where the light outside the ray is collected, at the irradiation position P on the workpiece 100.

(Second Adjustment Step S4)

After the above-described first adjustment step S2, in the second adjustment step S4, the other of the first moving step or the second moving step (that is, one of the first moving step or the second moving step where the change amount of the coma aberration is smaller) is performed so as to adjust the irradiation position P on the processing surface of the workpiece 100.

Thus, in the second adjustment step, the irradiation position P on the processing surface of the workpiece 100 is adjusted.

As an example of the adjustment process of the laser processing head 6 according to an embodiment, the case shown in FIGS. 5A to 5C will be described along the above-described first adjustment step S2 and second adjustment step S4.

The laser processing head 6 in FIGS. 5A to 5C corresponds to the laser processing head 6 shown in FIG. 2. That is, in the laser processing head 6 shown in FIGS. 5A to 5C, the optical system including the collimate lens 16 and the collecting lens 18 is configured such that the laser lights after passing through the collecting lens 18 have the coma aberration. Moreover, in the laser processing head 6 in FIGS. 5A to 5C, the laser irradiation part 14 can be moved by the first moving part 20, and the collecting lens 18 can be moved by the second moving part 24. Furthermore, in the laser processing head 6 in FIGS. 5A to 5C, it is configured such that the change amount of the coma aberration is larger in a case in which the first moving part 20 is operated than in a case in which the second moving part 24 is operated.

In the initial state shown in FIG. 5A, the laser irradiation part 14, the collimate lens 16, and the collecting lens 18 are arranged coaxially, and the optical axes of the collimate lens 16 and the collecting lens 18, and the optical axis of incident light from the laser irradiation part 14 match at an axis Q. However, in the initial state, the energy intensity distribution in the X direction at the irradiation position P is biased, the energy density is high in one end part in the X direction, and the energy density decreases toward the other end part.

From such an initial state, the first adjustment step S2 is performed to adjust the energy intensity distribution. More specifically, from the state of FIG. 5A, the first moving part 20, of the first moving part 20 and the second moving part 24, where the change amount of the coma aberration is larger is operated to move the laser irradiation part 14 in the first direction, changing the relative position of the collimate lens 16 with respect to the laser irradiation part 14 (see FIG. 5B). Consequently the laser lights from the collecting lens 18 deviate between the position P1, where the light in the vicinity of the center of the ray is collected, and the position P2, where the light outside the ray is collected (the coma aberration is generated; see (b) of FIG. 5B).

Using such generation of the coma aberration, it is possible to change the energy intensity distribution. For example, in the example shown in FIG. 5B, the energy intensity distribution in the X direction is flattened (see (a) of FIG. 5B) as compared with (a) of FIG. 5A, by moving the laser irradiation part 14 in the X direction with the first moving part 20.

Thus, in the first adjustment step S2, it is possible to effectively change the energy intensity distribution at the laser irradiation position P by operating one of the first moving part 20 and the second moving part 24 where the change amount of the coma aberration is larger (the first moving part 20 in FIGS. 5A to 5C). Thus, it is possible to appropriately adjust the energy intensity distribution at the laser irradiation position P by appropriately operating one of the first moving part 20 and the second moving part 24 (the first moving part 20 in FIGS. 5A to 5C).

It is possible to reduce unevenness of processing by the laser lights, by flattening the energy intensity distribution at the laser irradiation position P as in the above-described example. The laser lights have a certain degree of spread (a circular shape in the views, but may be an oval shape or the like) at the laser irradiation position P. A front and both lateral portions in a traveling direction of the laser lights with respect to the workpiece dominantly influence roughness of a cut surface. For example, if the workpiece is blanked, the laser lights contribute to cutting over the whole circumference thereof. Thus, if the energy intensity distribution at the laser irradiation position P is flattened, it is possible to uniform the degree of roughness of the cut surface, regardless of a cut portion.

As described above, it is possible to appropriately adjust the energy intensity distribution at the laser irradiation position P by performing the first adjustment step S2. However, as a result of changing the relative position of the collimate lens 16 with respect to the laser irradiation part 14, the irradiation position P (or the collecting position) of the laser lights on the workpiece 100 deviates from the axis Q (see FIG. 5B) at an initial position which is a processing point (see FIG. 5A).

Thus, the second adjustment step S4 is performed in order to move the irradiation position P, which deviates as a result of performing the first adjustment step S2, to the initial processing point. More specifically, from the state of FIG. 5B, the second moving part 24, of the first moving part 20 and the second moving part 24, where the change amount of the coma aberration is smaller is operated to move the collecting lens 18 in an X-axis direction (second direction), changing the relative position of the collecting lens 18 with respect to the collimate lens 16 in the second direction (see FIG. 5C). Thus, it is possible to move the irradiation position P (collecting position) of the laser lights from the collecting lens 18 in the second direction (X direction) to be positioned at the processing point (the position of the axis Q which is the initial position), as shown in FIG. 5C, for example.

One of the first moving part 20 and the second moving part 24, where the change amount of the coma aberration is smaller, (the second moving part 24 in FIGS. 5A to 5C) is thus appropriately operated, making it possible to appropriately adjust the irradiation position P of the laser lights. Thus, it is possible to correct the deviation of the laser irradiation position P, which is caused when the energy intensity distribution is adjusted in the first adjustment step S2.

FIGS. 19A and 19B are views showing an adjustment process of a typical laser processing head, where any one of the laser irradiation part 14, the collimate lens 16, or the collecting lens 18 is moved in the order of FIGS. 19A and 19B.

In the typical laser processing head shown in FIGS. 19A and 19B, unlike the laser processing head 6 shown in FIGS. 2, 3, 5A to 18C described above, the optical system including the collimate lens 16 and the collecting lens 18 has corrected coma aberration, and the laser lights after passing through the collecting lens 18 have no or very minor coma aberration.

In the initial state shown in FIG. 19A, similarly to FIG. 5A described above, the laser irradiation part 14, the collimate lens 16, and the collecting lens 18 are arranged coaxially, and the optical axes of the collimate lens 16 and the collecting lens 18, and the optical axis of incident light from the laser irradiation part 14 match at the axis Q. However, in the initial state, the energy intensity distribution in the X direction at the irradiation position P is biased, the energy density is high in the one end part in the X direction, and the energy density decreases toward the other end part.

As in the example shown in FIGS. 19A and 19B, in the case in which the optical system having the corrected coma aberration is used as the optical system including the collimate lens 16 and the collecting lens 18, since the coma aberration of the optical system described above is corrected, the laser lights are converged on one point at the collecting position by the collecting lens 18 (that is, the laser irradiation position P on the workpiece 100), even if the relative position of the collimate lens 16 with respect to the laser irradiation part 14 is changed by moving the laser irradiation part 14 from the initial state shown in FIG. 19A. Thus, the energy intensity distribution at the laser irradiation position P (see (a) of FIG. 19B) does not change greatly, as compared with that before the change of the relative position described above (see (a) of FIG. 19A). Therefore, in such a laser processing head, it is difficult to effectively adjust the energy intensity distribution.

In this regard, in the laser processing head 6 according to some embodiments, as described above, in the first adjustment step S2, it is possible to effectively change the energy intensity distribution at the laser irradiation position P by operating one of the first moving part 20 and the second moving part 24 where the change amount of the coma aberration is larger (for example, the first moving part 20 in FIGS. 5A to 5C). Thus, it is possible to appropriately adjust the energy intensity distribution at the laser irradiation position P by appropriately operating one of the first moving part 20 and the second moving part 24 (the first moving part 20 in FIGS. 5A to 5C).

Moreover, in the second adjustment step, one of the first moving part 20 and the second moving part 24, where the change amount of the coma aberration is smaller, (the second moving part 24 in FIGS. 5A to 5C) is appropriately operated, making it possible to appropriately adjust the irradiation position P of the laser lights. Thus, it is possible to correct the deviation of the laser irradiation position P, which is caused when the energy intensity distribution is adjusted in the first adjustment step S2.

Thus, with the laser processing head 6 according to the embodiments, it is possible to independently perform and achieve both adjustment of the energy intensity distribution of the laser lights irradiating the workpiece 100 and adjustment of the laser irradiation position P on the workpiece 100.

In the present specification, flattening of the energy intensity distribution is mainly described as adjustment of the energy intensity distribution in the first adjustment step S2. However, the present invention is not limited to this and includes adjustment to a desired energy intensity distribution. For example, in a case in which a workpiece is divided into two, and one is put into a product and the other is discarded as a scrap, since a processing surface of the scrap has no problem in having roughness, a region of laser light contacting the workpiece on a side to be the scrap need not have strong energy distribution. That is, since it is only necessary to let a region of the laser light contacting the workpiece on a side to be the product have the strong energy distribution, the present invention also includes adjustment of the energy intensity distribution such that the energy distribution dares to be biased to some extent.

Next, specific movement patterns of the first moving part 20 and the second moving part 24 in the method for adjusting the laser processing head according to some embodiments will be described with reference to FIGS. 5A to 18C. Regarding FIGS. 5A to 5C, movements of the first moving part 20 and the second moving part 24 have already been described in detail. Thus, hereinafter, examples shown in FIGS. 6A to 18C will be described mainly about a difference from the case shown in FIGS. 5A to 5C, and the description of the same point as the case in FIGS. 5A to 5C will be omitted, as needed. Moreover, in each example shown in FIGS. 5A to 18C, adjustment is made so as to flatten the energy intensity distribution of the laser lights.

The laser processing head 6 in FIGS. 6A to 6C corresponds to the laser processing head 6 shown in FIG. 2, similarly to the example shown in FIGS. 5A to 5C. That is, in the laser processing head 6 shown in FIGS. 6A to 6C, the optical system including the collimate lens 16 and the collecting lens 18 is configured such that the laser lights after passing through the collecting lens 18 have the coma aberration. Moreover, in the laser processing head 6 shown in FIGS. 6A to 6C, as in the case of FIGS. 5A to 5C, the laser irradiation part 14 can be moved by the first moving part 20, and the collecting lens 18 can be moved by the second moving part 24. Furthermore, in the laser processing head 6 shown in FIGS. 6A to 6C, unlike the case shown in FIGS. 5A to 5C, it is configured such that the change amount of the coma aberration is larger in the case in which the second moving part 24 is operated than in the case in which the first moving part 20 is operated.

In adjusting the laser processing head 6 shown in FIGS. 6A to 6C, the moving part (the first moving part 20 or the second moving part 24) operated in the first adjustment step S2 and the second adjustment step S4 is different from the case in FIGS. 5A to 5C.

That is, in the laser processing head 6 shown in FIGS. 6A to 6C, in the first adjustment step S2, the second moving part 24, of the first moving part 20 and the second moving part 24, where the change amount of the coma aberration is larger is operated to move the collimate lens 16 in the above-described second direction. Thus, it is possible to effectively change the energy intensity distribution at the laser irradiation position P by moving the relative position of the collecting lens 18 with respect to the collimate lens 16 in the second direction. Thus, it is possible to appropriately adjust the energy intensity distribution at the laser irradiation position P by appropriately operating the second moving part 24 (see FIG. 6B).

Moreover, in the second adjustment step S4, the first moving part 20, of the first moving part 20 and the second moving part 24, where the change amount of the coma aberration is smaller is appropriately operated to move the laser irradiation part 14. Thus, it is possible to appropriately adjust the irradiation position P of the laser lights by moving the relative position of the collimate lens 16 with respect to the laser irradiation part 14 in the above-described first direction. Thus, it is possible to correct the deviation of the laser irradiation position P (see FIG. 6B), which is caused when the energy intensity distribution is adjusted in the first adjustment step S2.

The examples shown in FIGS. 7A to 8C each correspond to the laser processing head 6 shown in FIG. 3, but are the same as the examples shown in FIGS. 5A to 6C, respectively, for the rest.

That is, in the laser processing head 6 shown in each of FIGS. 7A to 8C, the optical system including the collimate lens 16 and the collecting lens 18 is configured such that the laser lights after passing through the collecting lens 18 have the coma aberration. Moreover, in the laser processing head 6 shown in each of FIGS. 7A to 8C, the collimate lens 16 can be moved by the first moving part 20, and the collecting lens 18 can be moved by the second moving part 24. Furthermore, in the laser processing head 6 shown in FIGS. 7A to 7C, as in the case shown in FIGS. 5A to 5C, it is configured such that the change amount of the coma aberration is larger in the case in which the first moving part 20 is operated than in the case in which the second moving part 24 is operated, and in the laser processing head 6 shown in FIGS. 8A to 8C, as in the case shown in FIGS. 6A to 6C, it is configured such that the change amount of the coma aberration is larger in the case in which the second moving part 24 is operated than in the case in which the first moving part 20 is operated.

Therefore, in adjusting the laser processing head 6 shown in FIGS. 7A to 7C, in the first adjustment step S2, the first moving part 20, of the first moving part 20 and the second moving part 24, where the change amount of the coma aberration is larger is operated to move the collimate lens 16. Thus, it is possible to effectively change the energy intensity distribution at the laser irradiation position P by moving the relative position of the collimate lens 16 with respect to the laser irradiation part 14 in the above-described first direction (see FIG. 7B).

Moreover, in the second adjustment step S4, the second moving part 24, of the first moving part 20 and the second moving part 24, where the change amount of the coma aberration is smaller is appropriately operated to move the collimate lens 16 in the above-described second direction. Thus, it is possible to appropriately adjust the irradiation position P of the laser lights by moving the relative position of the collecting lens 18 with respect to the collimate lens 16 in the second direction (see FIG. 7C).

Figure 8A:
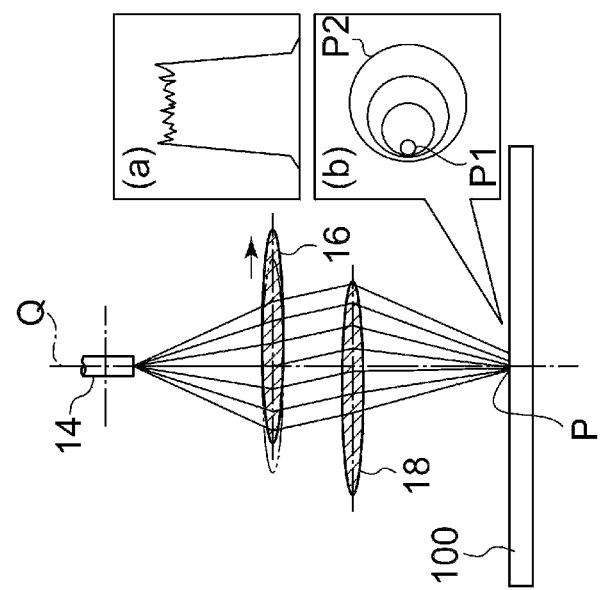
FIGS. 8A to 8C are of an example of an adjustment process of the laser processing head according to an embodiment.
Figure 8B:
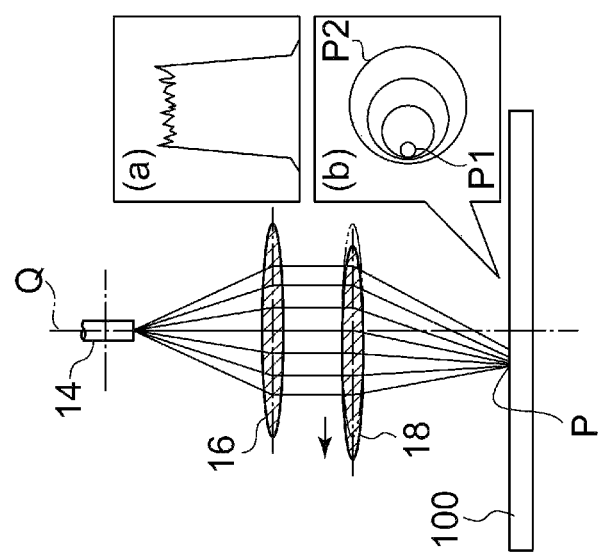
Figure 8C:
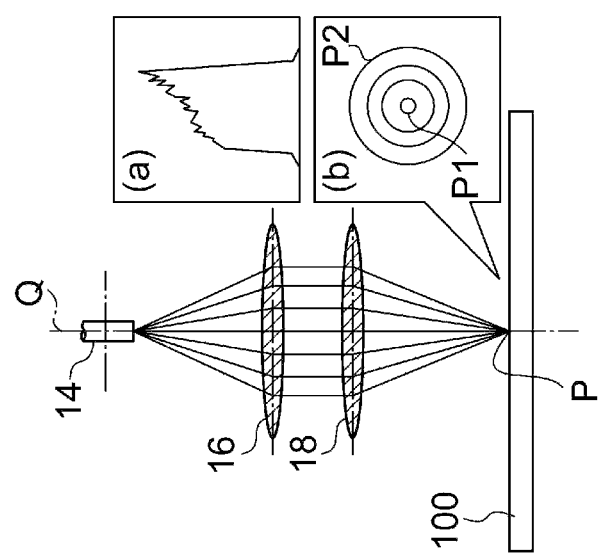

Moreover, in adjusting the laser processing head 6 shown in FIGS. 8A to 8C, in the first adjustment step S2, the second moving part 24, of the first moving part 20 and the second moving part 24, where the change amount of the coma aberration is larger is appropriately operated to move the collimate lens 16 in the above-described second direction. Thus, it is possible to effectively change the energy intensity distribution at the laser irradiation position P by moving the relative position of the collecting lens 18 with respect to the collimate lens 16 in the second direction (see FIG. 8B).

Moreover, in the second adjustment step S4, the first moving part 20, of the first moving part 20 and the second moving part 24, where the change amount of the coma aberration is smaller is operated to move the collimate lens 16. Thus, it is possible to appropriately adjust the irradiation position P of the laser lights by moving the relative position of the collimate lens 16 with respect to the laser irradiation part 14 in the above-described first direction (see FIG. 8C).

The examples shown in FIGS. 9A to 10B each correspond to the laser processing head 6 shown in FIG. 2, and are similar to the examples shown in FIGS. 5A to 6C, respectively.

The examples shown in FIGS. 9A to 10B are different from those in FIGS. 5A to 6C, respectively, in that, in the initial state (see FIG. 9A, FIG. 10A), the energy intensity distribution at the laser irradiation position P has already been flattened, and the irradiation position P of the laser lights deviates from the axis Q indicating the processing point in the X direction (first direction, second direction).

In the examples shown in FIGS. 9A to 10B, since the energy intensity distribution at the laser irradiation position P has already been flattened, in a case, such as blanking, in which the laser lights contribute to cutting over the whole circumference thereof, the energy intensity distribution need not be adjusted any more (that is, the first adjustment step S2 need not be performed). Thus, the deviation of the irradiation position P caused in the initial state (see FIG. 9A, FIG. 10A) is corrected by performing the second adjustment step S4 (see FIG. 9B, FIG. 10B).

If the energy distribution dares to be biased, the first adjustment step S2 is performed with the energy distribution in the initial state being flattened, and the deviation of the irradiation position P caused by the above adjustment may be corrected by performing the second adjustment step S4.

Figure 9A:
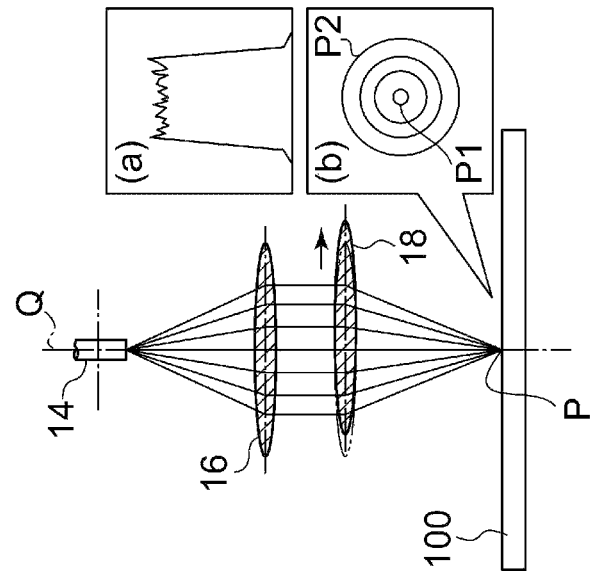
FIGS. 9A and 9B are views of an example of an adjustment process of the laser processing head according to an embodiment.
Figure 9B:
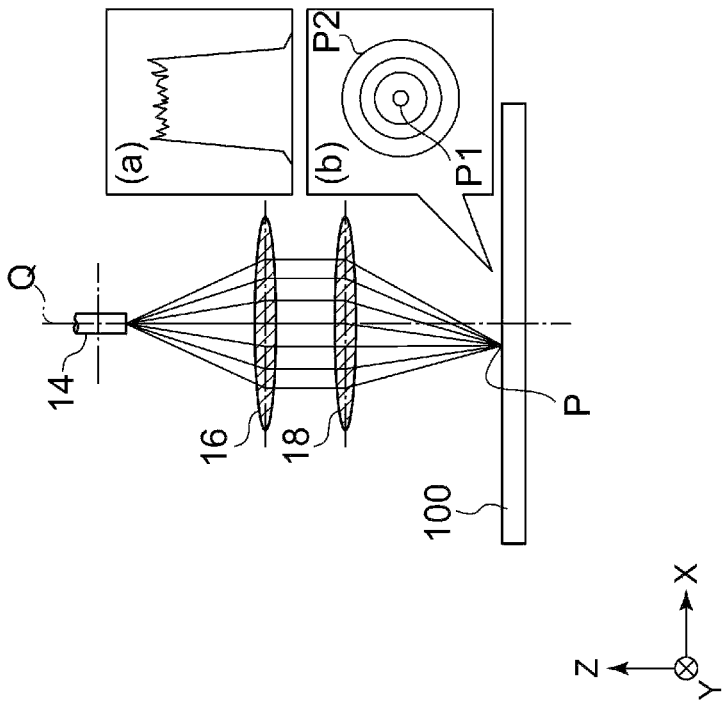
Figure 10A:
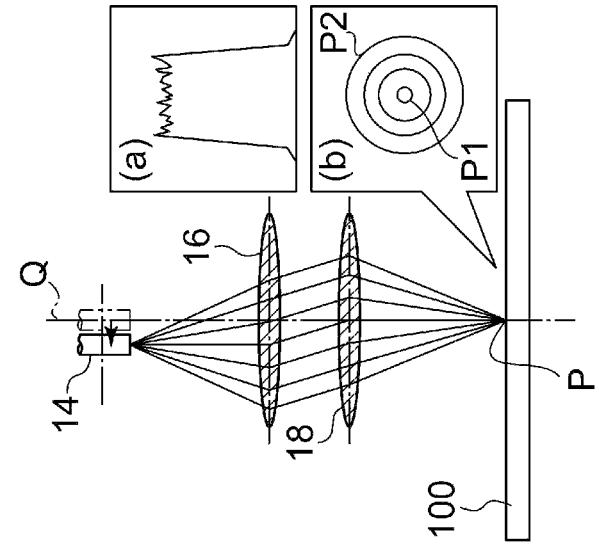
FIGS. 10A and 10B are views of an example of an adjustment process of the laser processing head according to an embodiment.
Figure 10B:
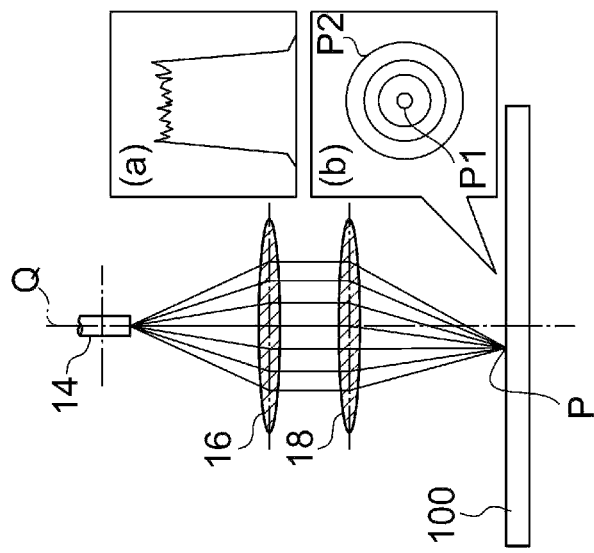

The second adjustment step S4 in the example shown in FIGS. 9A and 9B is the same as the second adjustment step S4 in the example shown in FIGS. 5A to 5C, and the second adjustment step S4 in the example shown in FIGS. 10A and 10B is the same as the second adjustment step S4 in the example shown in FIGS. 6A to 6C. Thus, the description thereof will be omitted.

Also in a case in which the irradiation position P deviates in the initial state, and the energy intensity distribution is adjusted, the energy intensity distribution is adjusted first, and then the irradiation position P is adjusted. As described above, this is because adjustment of the energy intensity distribution causes the deviation of the irradiation position P, making it necessary to readjust the irradiation position P adjusted earlier, which duplicates efforts.

The examples shown in FIGS. 11A to 12C each correspond to the laser processing head 6 shown in FIG. 2, and are similar to the examples shown in FIGS. 5A to 6C, respectively.

The examples shown in FIGS. 11A to 12C are different from those in FIGS. 5A to 6C, respectively, in that, in the initial state (see FIG. 11A, FIG. 12A), the irradiation position P (collecting position) of the laser lights deviates from the axis Q indicating the processing point in the X direction (first direction, second direction).

Figure 11A:
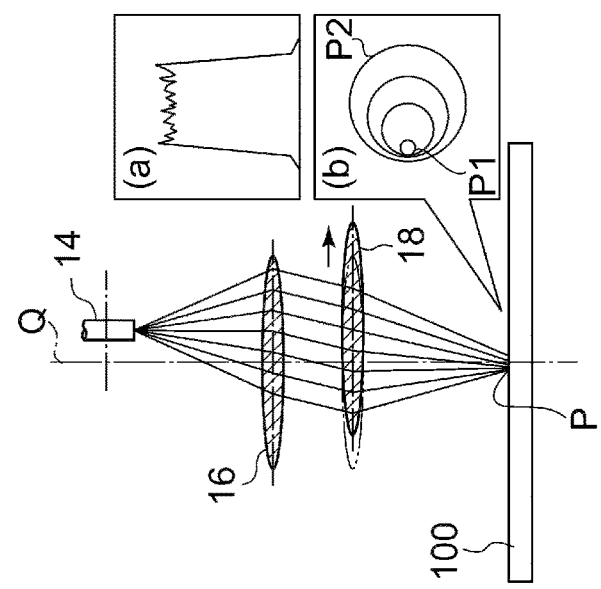
FIGS. 11A to 11C are views of an example of an adjustment process of the laser processing head according to an embodiment.
Figure 11B:
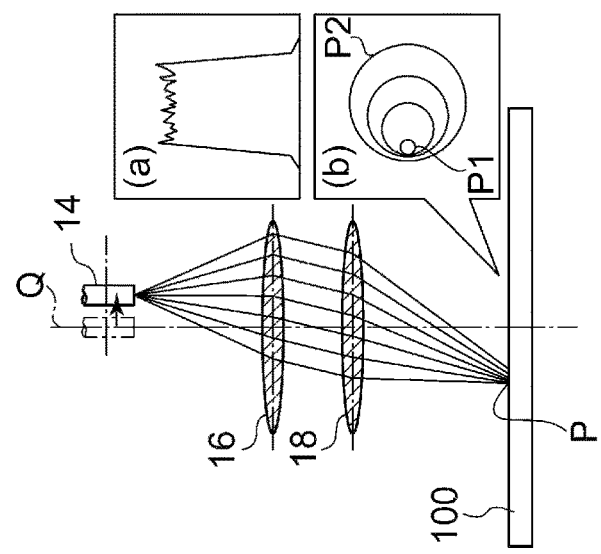
Figure 11C:
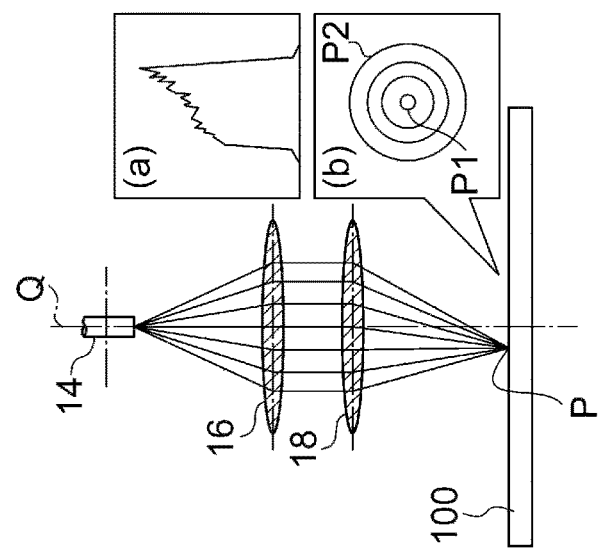

In the examples shown in FIGS. 11A to 12C, similarly to the examples shown in FIGS. 5A to 6C, respectively, it is possible to adjust the energy intensity distribution by performing the first adjustment step S2 (see FIG. 11B, FIG. 12B), and to adjust the irradiation position P of the laser lights by performing the second adjustment step S4 (see FIG. 11C, FIG. 12C).

However, in the examples shown in FIGS. 11A to 12C, in the initial state, in addition to the fact that the irradiation position P (collecting position) of the laser lights deviates from the axis Q indicting the processing point in the X direction (first direction, second direction), the irradiation position P further deviates from the axis Q (processing point) (see FIG. 11B, FIG. 12B) when the energy intensity distribution is adjusted by performing the first adjustment step S2. Thus, it is necessary to further increase the moving amount of the first moving part 20 or the second moving part 24 in order to move the irradiation position P of the laser lights to the position of the axis Q (processing point) in the second adjustment step S4.

The examples shown in FIGS. 13A to 14C each correspond to the laser processing head 6 shown in FIG. 2, and are similar to the examples shown in FIGS. 11A to 12C, respectively. The examples shown in FIGS. 13A to 14C are different from those in FIGS. 11A to 12C, respectively, in that, in the initial state (see FIG. 13A, FIG. 14A), the irradiation position P (collecting position) of the laser lights deviates from the axis Q indicating the processing point on an opposite side across the processing point, in the X direction (first direction, second direction).

Figure 13A:
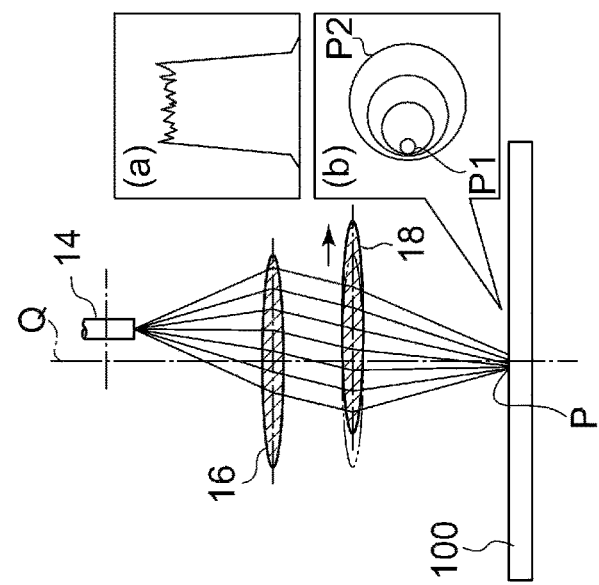
FIGS. 13A to 13C are views of an example of an adjustment process of the laser processing head according to an embodiment.
Figure 13B:
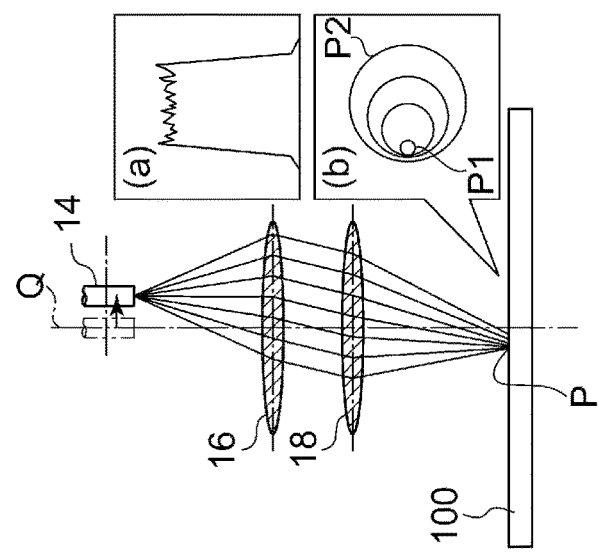
Figure 13C:
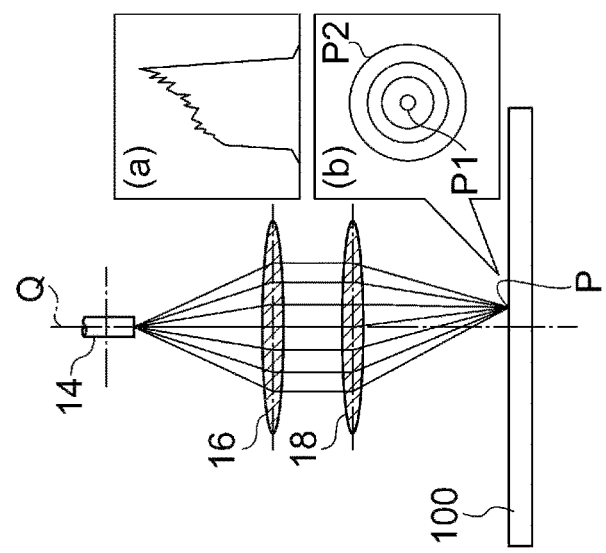

In the examples shown in FIGS. 13A to 14C, similarly to the examples shown in FIGS. 11A to 12C, respectively (that is, similarly to the examples shown in FIGS. 5A to 6C, respectively), it is possible to adjust the energy intensity distribution by performing the first adjustment step S2 (see FIG. 13B, FIG. 14B), and to adjust the irradiation position P of the laser lights by performing the second adjustment step S4 (see FIG. 13C, FIG. 14C).

However, in the examples shown in FIGS. 13A to 14C, the irradiation position P of the laser lights moves from the position in the initial state to the opposite side across the axis Q indicating the processing point, at a point in time when the energy intensity distribution is adjusted by performing the first adjustment step S2 (see FIG. 13B, FIG. 14B). In this case, in the second adjustment step S4, it is possible to appropriately adjust the irradiation position P by moving the first moving part 20 or the second moving part 24 in the same direction as the examples shown in FIGS. 11A to 12C.

The examples shown in FIGS. 15A to 16C each correspond to the laser processing head 6 shown in FIG. 2, and are similar to the examples shown in FIGS. 13A to 14C, respectively.

The examples shown in FIGS. 15A to 16C are different from those in FIGS. 13A to 14C, respectively, in that, in the initial state (see FIG. 15A, FIG. 16A), the irradiation position P (collecting position) of the laser lights deviates from the axis Q indicating the processing point on the opposite side across the processing point, in the X direction (first direction, second direction), and the deviation amount thereof is larger.

Figure 15A:
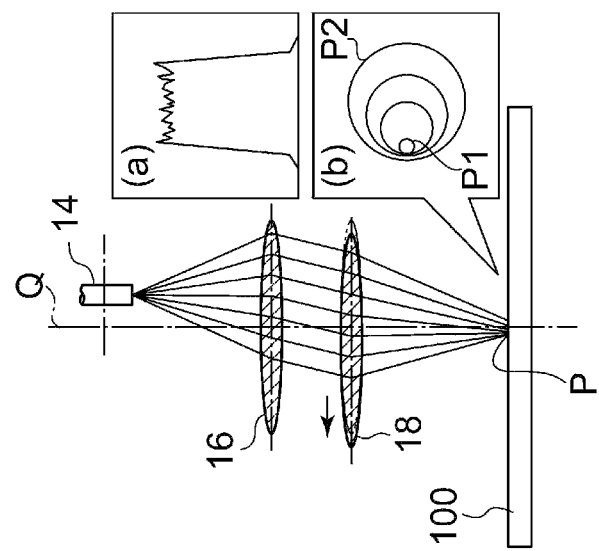
FIGS. 15A to 15C are views of an example of an adjustment process of the laser processing head according to an embodiment.
Figure 15B:
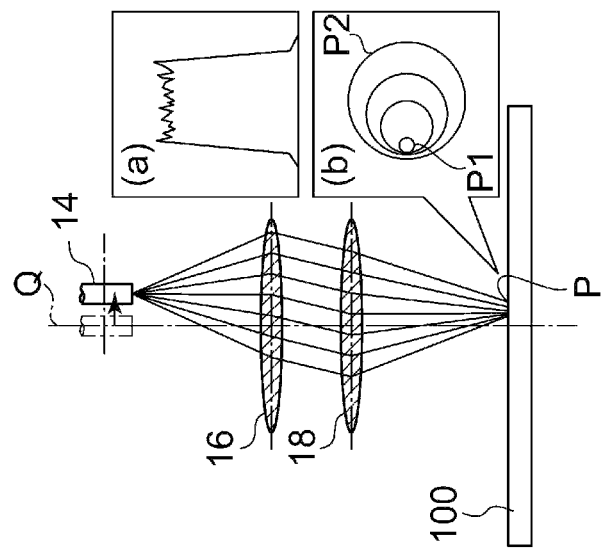
Figure 15C:
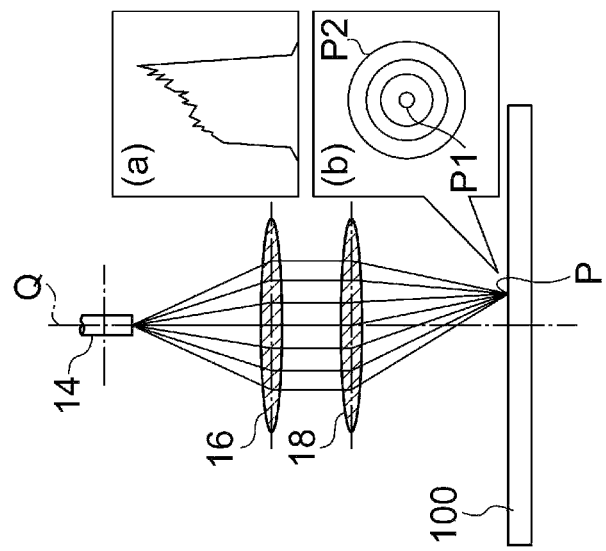
Figure 16A:
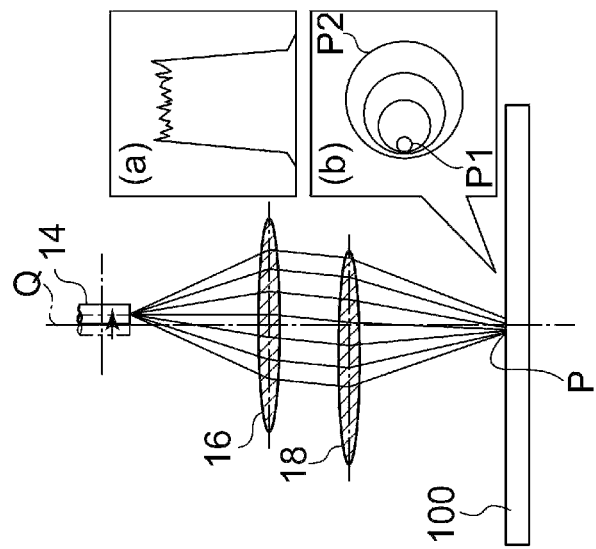
FIGS. 16A to 16C are views of an example of an adjustment process of the laser processing head according to an embodiment.
Figure 16B:
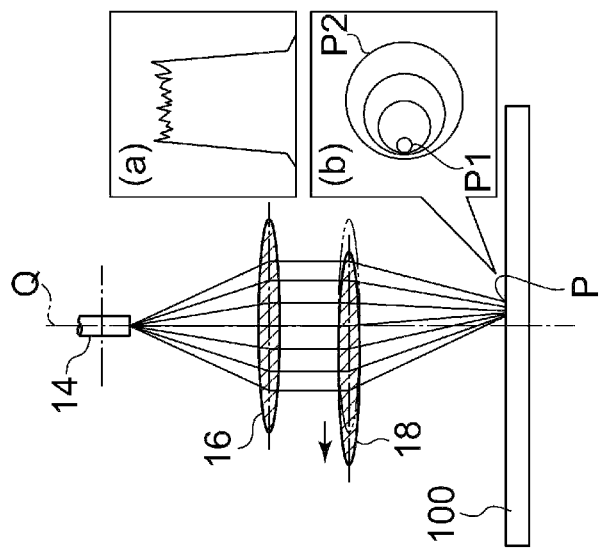
Figure 16C:
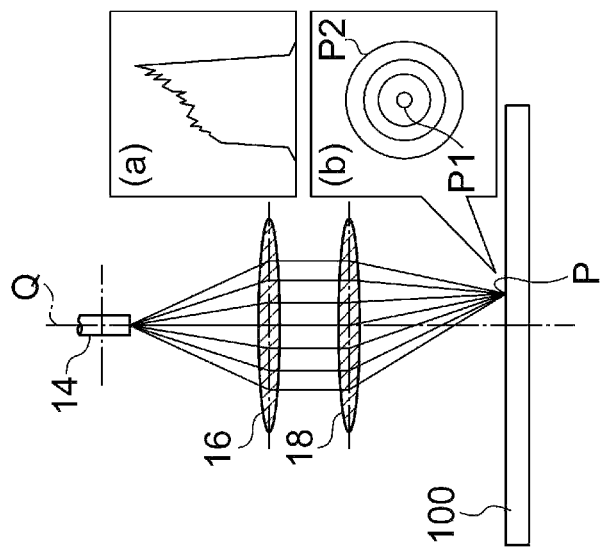

In the examples shown in FIGS. 15A to 16C, similarly to the examples shown in FIGS. 13A to 14C, respectively (that is, similarly to the examples shown in FIGS. 5A to 6C, respectively), it is possible to adjust the energy intensity distribution by performing the first adjustment step S2 (see FIG. 15B, FIG. 16B), and to adjust the irradiation position P of the laser lights by performing the second adjustment step S4 (see FIG. 15C, FIG. 16C).

In the examples shown in FIGS. 15A to 16C, the irradiation position P of the laser lights moves from the position in the initial state to be closer to the axis Q (processing point) in the X direction, but within a range which does not exceed the processing point, at the point in time when the energy intensity distribution is adjusted by performing the first adjustment step S2 (see FIG. 15B, FIG. 15B). In this case, in the second adjustment step S4, it is possible to appropriately adjust the irradiation position P by moving the first moving part 20 or the second moving part 24 oppositely, in the X direction, to the examples shown in FIGS. 13A to 14C.

FIGS. 17A2 and 18A2 show arrow views of cross-sections taken along lines A2-A2 in FIGS. 17A1 and 18A1, respectively. Moreover, FIGS. 17B and 18B, and FIGS. 17C and 18C are views each showing an example of an adjustment process of the laser processing head 6, as viewed from the same position as FIGS. 17A2 and 18A2.

The examples shown in FIGS. 17A1 to 18C each correspond to the laser processing head 6 shown in FIG. 2, and are similar to the examples shown in FIGS. 15A to 16C, respectively.

The examples shown in FIGS. 17A1 to 18C are different from those in FIGS. 15A to 16C, respectively, in that, in the initial state (see FIGS. 17A1 and A2, FIGS. 18A1 and A2), the irradiation position P (collecting position) of the laser lights deviates from the axis Q indicating the processing point not only in the X direction (first direction, second direction) but also in the Y direction orthogonal to the X direction.

In the examples shown in each of FIGS. 17A1 to 18C, the energy intensity distribution biased in the X direction in the initial state is flattened. First, in the first adjustment step S2, the energy intensity distribution in the X direction at the laser irradiation position P is adjusted by operating one of the first moving part 20 and the second moving part 24, where the change amount of the coma aberration is larger, to move the laser irradiation part 14 or the collecting lens 18 in the X direction (see FIG. 17B, FIG. 18B).

Moreover, in the second adjustment step S4, one of the first moving part 20 and the second moving part 24, where the change amount of the coma aberration is smaller, is operated to appropriately move the collecting lens 18 or the laser irradiation part 14 in the X direction and the Y direction. Thus, it is possible to appropriately adjust the irradiation position P of the laser lights by moving the relative position of the collimate lens 16 with respect to the laser irradiation part 14 or the relative position of the collecting lens 18 with respect to the collimate lens 16 in the X direction and the Y direction (see FIG. 17C, FIG. 18C).

In some embodiments, in the first adjustment step S2, the first moving part 20 is operated so as to move the laser irradiation part 14 along a direction from a position of low energy intensity toward a position of high energy intensity, in the X-Y plane (that is, the first moving step is performed).

For example, in the examples shown in FIGS. 5A to 5C, 11A to 11C, 13A to 13C, 15A to 15C, and 17A1 to 17C, in the initial state (see FIGS. 5A, 11A, 13A, 15A, and 17A1 and 17A2), the energy intensity distribution is biased in the X direction, and in the first adjustment step S2, adjustment is made so as to flatten the energy intensity distribution by moving the laser irradiation part 14 along the direction from the position of low energy intensity toward the position of high energy intensity, in the X direction (see FIGS. 5B, 11B, 13B, 15B, and 17B).

Alternatively, in some embodiments, in the first adjustment step S2, the first moving part 20 is operated so as to move the collimating optical system along a direction from the position of high energy intensity toward the position of low energy intensity, in the X-Y plane (that is, the first moving step is performed).

For example, in the example shown in FIGS. 7A to 7C, in the initial state (see FIG. 7A), the energy intensity distribution is biased in the X direction, and in the first adjustment step S2, adjustment is made so as to flatten the energy intensity distribution by moving the collimate lens 16 along the direction from the position of high energy intensity toward the position of low energy intensity in the X direction (see FIG. 7B).

Alternatively, in some embodiments, in the first adjustment step S2, the second moving part 24 is operated so as to move the collecting optical system along the direction from the position of high energy intensity toward the position of low energy intensity, in the X-Y plane (that is, the second moving step is performed).

For example, in the examples shown in FIGS. 6A to 6C, 8A to 8C, 12A to 12C, 14A to 14C, 16A to 16C, and 18A1 to 18C, in the initial state (see FIGS. 6A, 8A, 12A, 14A, 16A, and 18A1 and 18A2), the energy intensity distribution is biased in the X direction, and in the first adjustment step S2, adjustment is made so as to flatten the energy intensity distribution by moving the collecting lens 18 along the direction from the position of high energy intensity toward the position of low energy intensity in the X direction (see FIGS. 6B, 8B, 12B, 14B, 16B, and 18B).

Thus, it is possible to flatten the energy intensity distribution by appropriately operating the first moving part 20 or the second moving part 24 to appropriately move the laser irradiation part 14, the collimate lens 16, or the collecting lens 18, in accordance with the direction of the energy intensity distribution.

In some embodiments, in the second adjustment step S4, the second moving part 24 is operated so as to move the collecting optical system along a direction from the irradiation position P after the first adjustment step S2 toward the above-described processing point, on the processing surface of the workpiece 100 (that is, the second moving step is performed).

For example, in the examples shown in FIGS. 5A to 5C, 7A to 7C, 11A to 11C, 13A to 13C, 15A to 15C, and 17A1 to 17C, in the second adjustment step S4, the second moving part 24 is operated so as to move the collecting lens 18 along the direction from the irradiation position P after the first adjustment step S2 toward the above-described processing point (axis Q), on the processing surface of the workpiece 100, thereby adjusting the irradiation position P so that the irradiation position P is closer to the processing point.

Alternatively, in some embodiments, in the second adjustment step S4, the first moving part 20 is operated so as to move the laser irradiation part 14 along a direction from the processing point toward the irradiation position P after the first adjustment step S2, on the processing surface of the workpiece 100 (that is, the first moving step is performed).

For example, in the examples shown in FIGS. 6A to 6C, 12A to 12C, 14A to 14C, 16A to 16C, and 18A1 to 18C, in the second adjustment step S4, the first moving part 20 is operated so as to move the laser irradiation part 14 along the direction from above-described processing point (axis Q) toward the irradiation position P after the first adjustment step S2, on the processing surface of the workpiece 100, thereby adjusting the irradiation position P so that the irradiation position P is closer to the processing point.

Alternatively, in some embodiments, in the second adjustment step S4, the first moving part 20 is operated so as to move the collimating optical system along the direction from the irradiation position P after the first adjustment step S2 toward the above-described processing point, on the processing surface of the workpiece 100 (that is, the first moving step is performed).

For example, in the example shown in FIGS. 8A to 8C, in the second adjustment step S4, the first moving part 20 is operated so as to move the collimate lens 16 along the direction from the irradiation position P after the first adjustment step S2 toward the above-described processing point (axis Q), on the processing surface of the workpiece 100, thereby adjusting the irradiation position P so that the irradiation position P is closer to the processing point.

Thus, in the second adjustment step S4, the collecting lens 18 or the collimate lens 16 is moved along the direction from the laser irradiation position P after the first adjustment step S2 toward the processing point (axis Q), or the laser irradiation part 14 is moved along the direction from the processing point (axis Q) toward the irradiation position P after the first adjustment step S2, making it possible to appropriately move the laser irradiation position P on the processing surface to a desired position (that is, the processing point).

In some embodiments, in a moving direction of the collimating optical system with respect to the laser irradiation part 14 by the operation of the first moving part 20 (that is, in the first moving step), the moving direction in question and a moving direction of the collecting optical system with respect to the collimating optical system by the operation of the second moving part 24 (that is, in the second moving step) are opposite to each other.

For example, in the examples shown in FIGS. 5A to 5C, 6A to 6C, 7A to 7C, 8A to 8C, 11A to 11C, 12A to 12C, 13A to 13C, 14A to 14C, and 17A1 to 17C, in a moving direction of the collimate lens 16 with respect to the laser irradiation part 14 by the operation of the first moving part 20 (that is, in the first moving step), the moving direction in question and a moving direction of the collecting lens 18 with respect to the collimate lens 16 by the operation of the second moving part 24 (that is, in the second moving step) are opposite to each other.

Thus, if the irradiation position P in the initial state (see FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, FIG. 18A, and FIG. 19A) does not greatly deviate from the processing point in the workpiece 100, it is possible to flatten the energy intensity distribution and to correct the deviation of the irradiation position P by performing the first moving step as described above.

In some embodiments, in the first adjustment step S2, the energy intensity distribution on the processing surface of the workpiece 100 may be measured and based on the measurement result of the energy intensity distribution, the moving direction or the moving amount of the laser irradiation part 14, the collimate lens 16, or the collecting lens 18 may be decided.

The energy intensity distribution of the laser lights at the processing point may be measured by, for example, a beam mode measurement device (beam profiler).

The laser processing device 1 (see FIG. 1) according to some embodiments may include the above-described laser processing head 6, a measurement part (not shown), and a control part (not shown). The measurement part is configured to measure the energy intensity distribution, on the processing surface of the workpiece 100, of the laser light output from the laser processing head 6.

The control part is configured to decide the moving direction or the moving amount of the laser irradiation part 14, the collimate lens 16, or the collecting lens 18, based on the measurement result of the energy intensity distribution by the measurement part.

The measurement part may be, for example, the above-described beam mode measurement device.

In some embodiments, in the first adjustment step S2, the moving direction or the moving amount of the laser irradiation part 14, the collimate lens 16, or the collecting lens 18 may be decided based on an observation result of a processing mark of the workpiece 100.

Thus, in the first adjustment step S2 of adjusting the energy intensity distribution at the laser irradiation position P, the moving direction or the moving amount of the laser irradiation part 14, the collimate lens 16, or the collecting lens 18 is decided based on the measurement result of the energy intensity distribution at the processing point of the workpiece 100 or the observation result of the processing mark of the workpiece 100, making it possible to adjust the energy intensity distribution at the laser irradiation position P more accurately.

Hereinafter, the overview of the laser processing head 6, the laser processing device 1, and the method for adjusting the laser processing head 6 according to some embodiments will be described.

(1) A laser processing head according to at least one embodiment of the present invention is a laser processing head including a laser irradiation part, a collimating optical system for collimating laser light from the laser irradiation part, and a collecting optical system for collecting the laser light after passing through the collimating optical system. An optical system including the collimating optical system and the collecting optical system is configured such that the laser light after passing through the collecting optical system has coma aberration. The laser processing head further includes a first moving part for moving at least one of the laser irradiation part or the collimating optical system so as to change a relative position of the collimating optical system with respect to the laser irradiation part, in a first direction orthogonal to a center axis of the laser irradiation part or the collimating optical system, and a second moving part for moving the collecting optical system so as to change a relative position of the collecting optical system with respect to the collimating optical system, in a second direction orthogonal to a center axis of the collecting optical system.

In the case where the optical system having the corrected coma aberration is used, which is unlike the above-described configuration, as the optical system including the collimating optical system and the collecting optical system, the laser light is converged on one point at the collecting position by the collecting optical system (that is, the laser irradiation position on the workpiece), even if the relative position of the collimating optical system with respect to the laser irradiation part or the relative position of the collecting optical system with respect to the collimating optical system is changed. Thus, the energy intensity distribution at the collecting position is not changed greatly, compared to before the change in the relative position described above.

By contrast, in the above configuration (1), since the optical system including the collimating optical system and the collecting optical system is configured such that the laser light after passing through the collecting optical system has the coma aberration, the laser light from the collecting optical system deviates between the position, where the light in the vicinity of the center of the ray is collected, and the position, where the light outside the ray is collected (the coma aberration is generated) by changing the relative position of the collimating optical system with respect to the laser irradiation part by the first moving part, or by moving the relative position of the collecting optical system with respect to the collimating optical system by the second moving part. Therefore, it is possible to effectively change the energy intensity distribution at the laser irradiation position by operating one of the first moving part and the second moving part where the change amount of the coma aberration is larger. Thus, it is possible to appropriately adjust the energy intensity distribution at the laser irradiation position by appropriately operating one of the first moving part and the second moving part.

Moreover, in the above configuration (1), since the other of the first moving part and the second moving part (one of the first moving part and the second moving part where the change amount of the coma aberration is smaller) can be operated independently of the one of the first moving part and the second moving part, it is possible to adjust the laser irradiation position without greatly changing the energy intensity distribution at the laser irradiation position, by operating the other. Thus, since the other of the first moving part and the second moving part is appropriately operated, it is possible to correct the deviation of the laser irradiation position, which is caused when the energy intensity distribution is adjusted.

Thus, with the above configuration (1), it is possible to achieve both adjustment of the energy intensity distribution of the laser light irradiating the workpiece and adjustment of the laser irradiation position on the workpiece.

(2) In some embodiments, in the above configuration (1), the collimating optical system and the collecting optical system each include at least one lens, and the laser irradiation part, the collimating optical system, and the collecting optical system are arranged in this order, in a direction along the center axis of the collecting optical system.

With the above configuration (2), since the collimating optical system and the collecting optical system each include the at least one lens, and the laser irradiation part, the collimating optical system, and the collecting optical system are arranged in this order, in the direction along the center axis of the collecting optical system, it is possible to implement the above configuration (1) with a compact configuration.

(3) A laser processing device according to at least one embodiment of the present invention includes the laser processing head according to the above configuration (1) or (2), a measurement part configured to measure an energy intensity distribution of the laser light on a processing surface of a workpiece, the laser light being output from the laser processing head, and a control part configured to decide, based on a measurement result by the measurement part, a moving direction or a moving amount of the laser irradiation part, the collimating optical system, or the collecting optical system.

With the above configuration (3), since the moving direction or the moving amount of the laser irradiation part, the collimating optical system, or the collecting optical system by the first moving part or the second moving part is decided based on the measurement result of the energy intensity distribution by the measurement part, it is possible to change the energy intensity distribution at the laser irradiation position more accurately.

(4) A method for adjusting a laser processing head according to at least one embodiment of the present invention is a method for adjusting the laser processing head including a laser irradiation part, a collimating optical system for collimating laser light from the laser irradiation part, and a collecting optical system for collecting the laser light after passing through the collimating optical system, an optical system including the collimating optical system and the collecting optical system being configured such that the laser light after passing through the collecting optical system has coma aberration, the method including a first moving step of moving at least one of the laser irradiation part or the collimating optical system so as to change a relative position of the collimating optical system with respect to the laser irradiation part, in a first direction orthogonal to a center axis of the laser irradiation part or the collimating optical system, and a second moving step of moving the collecting optical system so as to change a relative position of the collecting optical system with respect to the collimating optical system, in a second direction orthogonal to a center axis of the collecting optical system.

In the above method (4), since the optical system including the collimating optical system and the collecting optical system is configured such that the laser light after passing through the collecting optical system has the coma aberration, the laser light from the collecting optical system deviates between the position, where the light in the vicinity of the center of the ray is collected, and the position, where the light outside the ray is collected (the coma aberration is generated) by changing the relative position of the collimating optical system with respect to the laser irradiation part in the first moving step, or by moving the relative position of the collecting optical system with respect to the collimating optical system in the second moving step. Therefore, it is possible to effectively change the energy intensity distribution at the laser irradiation position by performing one of the first moving step and the second moving step where the change amount of the coma aberration is larger. Thus, it is possible to appropriately adjust the energy intensity distribution at the laser irradiation position by appropriately operating one of the first moving step and the second moving step.

Moreover, in the above method (4), since the other of the first moving step and the second moving step (one of the first moving step and the second moving step where the change amount of the coma aberration is smaller) is performed independently of the one of the first moving step and the second moving step, it is possible to adjust the laser irradiation position without greatly changing the energy intensity distribution at the laser irradiation position, by performing the other. Thus, since the other of the first moving step and the second moving step is appropriately performed, it is possible to correct the deviation of the laser irradiation position, which is caused when the energy intensity distribution is adjusted.

Thus, with the above method (4), it is possible to achieve both adjustment of the energy intensity distribution of the laser light irradiating the workpiece and adjustment of the laser irradiation position on the workpiece.

(5) In some embodiments, in the above method (4), the collimating optical system and the collecting optical system each include at least one lens, and the laser irradiation part, the collimating optical system, and the collecting optical system are arranged in this order, in a direction along the center axis of the collecting optical system.

With the above method (5), since the collimating optical system and the collecting optical system each include the at least one lens, and the laser irradiation part, the collimating optical system, and the collecting optical system are arranged in this order, in the direction along the center axis of the collecting optical system, it is possible to implement the above method (5) with a compact configuration.

(6) In some embodiments, in the above method (4) or (5), the method for adjusting the laser processing head includes a first adjustment step of performing one of the first moving step or the second moving step so as to adjust an energy intensity of the laser light on a processing surface of a workpiece to a desired distribution, the laser light being output from the laser processing head, and a second adjustment step of performing the other of the first moving step or the second moving step so as to adjust an irradiation position on the processing surface, after the first adjustment step. The first adjustment step includes performing one of the first moving step or the second moving step, where a change amount of the coma aberration relative to a moving amount of the collimating optical system with respect to the laser irradiation part in the first direction or a moving amount of the collecting optical system with respect to the collimating optical system in the second direction is larger.

With the above method (6), since the first adjustment step first includes performing one of the first moving step or the second moving step, where the change amount of the coma aberration is larger, to adjust the energy intensity distribution of the laser light on the processing surface of the workpiece, it is possible to effectively change the energy intensity distribution at the laser irradiation position by using the larger change amount of the coma aberration. Moreover, since, after the first adjustment step, the second adjustment step includes performing the other of the first moving step or the second step (one of the first moving step or the second moving step where the change amount of the coma aberration is smaller) to adjust the laser irradiation position, it is possible to adjust the laser irradiation position without greatly changing the energy intensity distribution at the laser irradiation position.

Thus, with the above method (6), it is possible to achieve both adjustment of the energy intensity distribution of the laser light irradiating the workpiece and adjustment of the laser irradiation position on the workpiece.

(7) In some embodiments, in the above method (6), the first adjustment step includes measuring the energy intensity distribution and deciding, based on a measurement result of the energy intensity distribution, the moving direction or the moving amount of the laser irradiation part, the collimating optical system, or the collecting optical system.

With the above method (7), since, in the first adjustment step of adjusting the energy intensity distribution at the laser irradiation position, the moving direction or the moving amount of the laser irradiation part, the collimating optical system, or the collecting optical system is decided based on the measurement result of the energy intensity distribution, it is possible to change the energy intensity distribution at the laser irradiation position more accurately.

(8) In some embodiments, in the above method (6) or (7), the first adjustment step includes deciding the moving direction or the moving amount of the laser irradiation part, the collimating optical system, or the collecting optical system, based on an observation result of a processing mark of the workpiece.

With the above method (8), since, in the first adjustment step of adjusting the energy intensity distribution at the laser irradiation position, the moving direction or the moving amount of the laser irradiation part, the collimating optical system, or the collecting optical system is decided based on the observation result of the processing mark of the workpiece, it is possible to change the energy intensity distribution at the laser irradiation position more accurately.

(9) In some embodiments, in any one of the above methods (6) to (8), the second adjustment step includes performing the other of the first moving step or the second moving step such that the irradiation position is closer to a processing point on the processing surface.

With the above method (9), since, in the second adjustment step of adjusting the laser irradiation position, the laser irradiation part, the collimating optical system, or the collecting optical system is moved such that the laser irradiation position is closer to the processing point on the processing surface of the workpiece, it is possible to appropriately process the workpiece at the predetermined processing point.

(10) In some embodiments, in the above method (9), the second adjustment step includes performing the second moving step so as to move the collecting optical system along a direction from the irradiation position after the first adjustment step toward the processing point, on the processing surface.

(11) Alternatively, in some embodiments, in the above method (9), the second adjustment step includes performing the first moving step so as to move the laser irradiation part along a direction from processing point toward the irradiation position after the first adjustment step, on the processing surface.

(12) Alternatively, in some embodiments, in the above method (9), the second adjustment step includes performing the first moving step so as to move the collimating optical system along a direction from the irradiation position after the first adjustment step toward the processing point, on the processing surface.

With the above methods (10) to (12), since, in the second adjustment step, the collecting optical system or the collimating optical system is moved along the direction from the laser irradiation position after the first adjustment step toward the processing point, or the laser irradiation part is moved along the direction from the processing point toward the irradiation position after the first adjustment step, it is possible to move the laser irradiation position on the processing surface to a desired position (that is, the processing point).

Embodiments of the present invention were described above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "containing" or "having" one constitutional element is not an exclusive expression that excludes the presence of other constitutional elements.

REFERENCE SIGNS LIST

1 Laser processing device
2 Laser oscillator
4 Optical fiber
6 Laser processing head
8 Processing stage
12 Housing
14 Laser irradiation part
16 Collimate lens
18 Collecting lens
20 First moving part
21 Holding part
22 First lens holding part 24 Second moving part
25 Second lens holding part
26 Assist gas nozzle
28 Gas supply port
30 Gas outlet
100 Workpiece
O1 to O3 Center axis
P Irradiation position

The invention claimed is:

1. A laser processing device, comprising:
a laser irradiation part;
a collimate lens collimating laser light from the laser irradiation part; and
a collecting lens collecting the laser light after passing through the collimate lens,
wherein an optical system including the collimate lens and the collecting lens is configured such that the laser light after passing through the collecting lens has coma aberration, and
wherein the laser processing device further includes:
a first mover moving at least one of the laser irradiation part or the collimate lens so as to change a relative position of the collimate lens with respect to the laser irradiation part, in a first direction orthogonal to a center axis of the laser irradiation part or the collimate lens; and
a second mover moving the collecting lens so as to change a relative position of the collecting lens with respect to the collimate lens, in a second direction orthogonal to a center axis of the collecting optical system,
wherein the laser processing device is configured such that one of the first mover and the second mover is operated so as to adjust an energy intensity distribution of the laser light from the laser processing device on a processing surface of a workpiece to a desired distribution, and then the other one of the first mover and the second mover is operated so as to adjust an irradiation position on the processing surface, and
wherein the one is either of the first mover and the second mover which has a larger change amount of the coma aberration relative to a moving amount of the collimate lens with respect to the laser irradiation part in the first direction for the first mover or relative to a moving amount of the collecting lens with respect to the collimate lens in the second direction for the second mover than the other one of the first mover and the second mover.

2. The laser processing device according to claim 1, wherein the collimate lens and the collecting lens each include at least one lens, and wherein the laser irradiation part, the collimate lens, and the collecting lens are arranged in this order, in a direction along the center axis of the collecting the collecting lens.

3. The laser processing device according to claim 1, further comprising: a beam profiler configured to measure an energy intensity distribution of the laser light from the laser processing device on a processing surface of a workpiece; and a controller configured to determine, based on a measurement result by the measurement device, a moving direction in the first or second direction or the moving amount of the laser irradiation part, the collimate lens, or the collecting lens.

4. A method for adjusting a laser processing head including a laser irradiation part, a collimate lens collimating laser light from the laser irradiation part, and a collecting lens collecting the laser light after passing through the collimate lens, an optical system including the collimate lens and the collecting lens being configured such that the laser light after passing through the collecting lens has coma aberration, the method comprising: a first moving step of moving at least one of the laser irradiation part or the collimate lens so as to change a relative position of the collimate lens with respect to the laser irradiation part, in a first direction orthogonal to a center axis of the laser irradiation part or the collimate lens; a second moving step of moving the collecting lens so as to change a relative position of the collecting lens with respect to the collimate lens, in a second direction orthogonal to a center axis of the collecting lens, a first adjustment step of performing one of the first moving step or the second moving step so as to adjust an energy intensity distribution of the laser light from the laser processing head on a processing surface of a workpiece to a desired distribution; and a second adjustment step of performing the other of the first moving step or the second moving step so as to adjust an irradiation position on the processing surface, after the first adjustment step, wherein the one is either of the first moving step or the second moving step in which obtained is a larger change amount of the coma aberration relative to a moving amount of the collimate lens with respect to the laser irradiation part in the first direction for the first moving step or relative to a moving amount of the collecting lens with respect to the collimate lens in the second direction for the second moving step than in other one of the first moving step or the second moving step is.

5. The method for adjusting the laser processing head according to claim 4, wherein the collimate lens and the collecting lens each include at least one lens, and wherein the laser irradiation part, the collimating optical system, and the collecting lens are arranged in this order, in a direction along the center axis of the collecting lens.

6. The method for adjusting the laser processing head according to claim 4, wherein the first adjustment step includes measuring the energy intensity distribution, a moving direction in the first or second direction or the moving amount of the laser irradiation part, the collimate lens, or the collecting lens, based on a measurement result of the energy intensity distribution.

7. The method for adjusting the laser processing head according to claim 4,
wherein the second adjustment step includes performing the other of the first moving step or the second moving step such that the irradiation position is closer to a processing point on the processing surface.

8. The method for adjusting the laser processing head according to claim 7,
wherein the second adjustment step includes performing the second moving step so as to move the collecting lens along a direction from the irradiation position after the first adjustment step toward the processing point, on the processing surface.

9. The method for adjusting the laser processing head according to claim 7,
wherein the second adjustment step includes performing the first moving step so as to move the laser irradiation part along a direction from processing point toward the irradiation position after the first adjustment step, on the processing surface.

10. The method for adjusting the laser processing head according to claim 7,
wherein the second adjustment step includes performing the first moving step so as to move the collimate lens along a direction from the irradiation position after the first adjustment step toward the processing point, on the processing surface.

\* \* \* \* \*